(12) United States Patent
Asakawa et al.

(10) Patent No.: US 12,533,761 B2
(45) Date of Patent: Jan. 27, 2026

(54) AUTOMATIC TOOL EXCHANGER

(71) Applicant: FUJI CORPORATION, Chiryu (JP)

(72) Inventors: Kazuya Asakawa, Toyota (JP);
Toshifumi Suzuki, Toyota (JP)

(73) Assignee: FUJI CORPORATION, Chiryu (JP)

( * ) Notice: Subject to any disclaimer, the term of this patent is extended or adjusted under 35 U.S.C. 154(b) by 481 days.

(21) Appl. No.: 18/040,865

(22) PCT Filed: Oct. 7, 2020

(86) PCT No.: PCT/JP2020/037968
§ 371 (c)(1),
(2) Date: Feb. 7, 2023

(87) PCT Pub. No.: WO2022/074755
PCT Pub. Date: Apr. 14, 2022

(65) Prior Publication Data
US 2023/0302593 A1 Sep. 28, 2023

(51) Int. Cl.
*B23Q 3/155* (2006.01)
*B23B 3/16* (2006.01)
(Continued)

(52) U.S. Cl.
CPC .......... *B23Q 3/15713* (2013.01); *B23B 3/168* (2013.01); *B23Q 3/15553* (2013.01);
(Continued)

(58) Field of Classification Search
CPC ......... Y10T 483/1705; Y10T 483/1724; Y10T 29/5109–5114; Y10T 483/115;
(Continued)

(56) References Cited

U.S. PATENT DOCUMENTS 4,300,278 A * 11/1981 Nomura ............... B23Q 3/1554
483/44
6,007,464 A * 12/1999 Hashimoto ........ B23Q 3/15746
483/39
(Continued)

FOREIGN PATENT DOCUMENTS

JP 54-035486 A * 3/1979
JP 59-47136 A 3/1984
(Continued)

OTHER PUBLICATIONS

Machine Translation of JP 54-035486 A, which JP '486 was published Mar. 1979.*
(Continued)

*Primary Examiner* — Erica E Cadugan
(74) *Attorney, Agent, or Firm* — Oblon, McClelland, Maier & Neustadt, L.L.P.

(57) ABSTRACT

In order to be suitable for space-saving of a multi-functional processing machine in which a tool main spindle device is disposed at a center of an opposed biaxial lathe, there is provided an automatic tool exchanger provided in the multi-functional processing machine, the automatic tool exchanger including: a tool magazine that is disposed in a machine body front surface upper portion of the multi-functional processing machine and is configured to house multiple tools for exchange with respect to the tool main spindle device; a shift device configured to move the tool between the tool magazine and a tool exchanging position with respect to the tool main spindle device; and a tool changer configured to exchange the tool between the shift device and the tool main spindle device.

9 Claims, 19 Drawing Sheets

(51) Int. Cl.
| | |
|---|---|
| *B23B 11/00* | (2006.01) |
| *B23Q 3/157* | (2006.01) |
| *B23Q 11/08* | (2006.01) |
| *B23Q 17/09* | (2006.01) |
| *B23Q 39/00* | (2006.01) |
| *B23Q 39/04* | (2006.01) |
| *B25J 15/08* | (2006.01) |

(52) U.S. Cl.
CPC ...... *B23Q 11/0891* (2013.01); *B23Q 17/0909* (2013.01); *B23Q 39/048* (2013.01); *B25J 15/083* (2013.01); *B23Q 3/15513* (2013.01); *B23Q 2003/1553* (2016.11); *B23Q 2003/155428* (2016.11); *B23Q 2003/155439* (2016.11); *B23Q 3/15766* (2013.01); *B23Q 3/15773* (2013.01); *B23Q 2039/004* (2013.01); *B23Q 2039/008* (2013.01); *Y10S 483/902* (2013.01); *Y10T 29/5114* (2015.01); *Y10T 483/115* (2015.01); *Y10T 483/138* (2015.01); *Y10T 483/1705* (2015.01); *Y10T 483/1724* (2015.01); *Y10T 483/1776* (2015.01); *Y10T 483/1779* (2015.01); *Y10T 483/1827* (2015.01)

(58) Field of Classification Search
CPC ..... Y10T 483/13–138; Y10T 483/1755–1788; B23Q 3/155–3/15793; B23Q 11/08–11/0891; B23Q 17/0909; B23Q 3/15553; B23Q 3/1554; B23Q 2003/155418; B23Q 2003/155428; B23Q 2003/155439; B23Q 3/15513; B23Q 3/15573; B23Q 3/15713–3/1578; B23B 3/065; B23B 3/165; B23B 3/168; B23B 11/00; Y10S 483/902
USPC ........... 483/18, 26, 22, 3, 7–11, 902, 39–53; 29/27 R–27 C
See application file for complete search history.

(56) References Cited

U.S. PATENT DOCUMENTS

| | | | |
|---|---|---|---|
| 2002/0014139 A1* | 2/2002 | Hirose | B23B 3/168 82/121 |
| 2010/0282037 A1* | 11/2010 | Fujimoto | B23Q 39/048 483/18 |
| 2011/0107573 A1* | 5/2011 | Fujioka | B23B 31/265 29/27 A |
| 2014/0079500 A1* | 3/2014 | Boehringer | B23Q 7/046 409/134 |
| 2015/0266153 A1* | 9/2015 | Kanehira | B23Q 17/0909 483/10 |
| 2018/0222002 A1* | 8/2018 | Kasahara | B23Q 3/15503 |
| 2022/0176506 A1* | 6/2022 | Kintoki | B23Q 3/15773 |
| 2023/0286057 A1* | 9/2023 | Mizuta | B23B 11/00 |
| 2023/0321731 A1* | 10/2023 | Suzuki | B23Q 39/027 |
| 2024/0001498 A1* | 1/2024 | Asakawa | B23Q 3/1554 |
| 2024/0391041 A1* | 11/2024 | Nakamura | B23Q 3/15773 |

FOREIGN PATENT DOCUMENTS

| | | |
|---|---|---|
| JP | 61-127936 U | 8/1986 |
| JP | 63-74534 A | 4/1988 |
| JP | 2002-126962 A | 5/2002 |
| KR | 20-0471002 Y1 | 1/2014 |
| KR | 10-2015-0014812 A | 2/2015 |
| TW | 200936305 A * | 9/2009 |
| WO | WO 01/30522 A1 | 5/2001 |
| WO | WO 2017/017825 A1 | 2/2017 |

OTHER PUBLICATIONS

International Search Report issued Dec. 28, 2020 in PCT/JP2020/037968, filed on Oct. 7, 2020, citing documents 16-22 therein, 3 pages.

* cited by examiner

AUTOMATIC TOOL EXCHANGER

TECHNICAL FIELD

The present disclosure relates to an automatic tool exchanger suitable for saving a space of a multi-functional processing machine.

BACKGROUND ART

Patent Literature 1 discloses a multi-functional NC lathe (multi-functional processing machine) capable of performing processing such as a machining center. This multi-functional processing machine is an opposed biaxial lathe having a tool spindle capable of exchanging a tool and a tool turret including multiple exchanging tools, and is for efficiently processing workpieces in various shapes, from materials to finished products, on the same machine. Specifically, a left side main spindle and a right side main spindle facing each other on the same axis line are included, a left side turret tool rest and a right side turret tool rest are disposed on front lower sides of both main spindles, and further, a third tool rest is provided on a back upper side of both main spindles. The multi-functional processing machine of the conventional example is provided with a tool magazine for accommodating multiple tools to be used for the third tool rest, and an automatic tool exchanger for exchanging the tools in the tool rests.

PATENT LITERATURE

Patent Literature 1: International Publication No. WO2001/030522

BRIEF SUMMARY

Technical Problem

In the above-described multi-functional processing machine described as a conventional example, the multiple tools are attached in a circumferential direction to the tool rest of the tool turret disposed on the left and right sides, so that various types of processing on a workpiece can be performed by revolving indexing. In addition, the tool magazine is provided on the third tool rest to be able to handle various types of processing, and various tools that can be exchanged with respect to the tool spindle are housed. The exchange of the tools with respect to the third tool rest is performed by the automatic tool exchanger. Meanwhile, since the automatic tool exchanger is provided on a bed together with each device such as a turret tool rest, the arrangement and configuration thereof are problematic in order to make the multi-functional processing machine installable in a space-saving manner.

For example, in the above-described conventional example, the automatic tool exchanger is also mounted on the bed provided with the left and right main spindles, the turret tool rest, and the like, and is disposed at a rear left side of the bed. Accordingly, in order to perform a tool exchange with respect to the third tool rest, a structure for moving the tool rest to the automatic tool exchanger on the bed in which each device is disposed is provided, so that the multi-functional processing machine is increased in size by the same amount. Therefore, the conventional automatic tool exchanger is not suitable for realizing the space-saving of the multi-functional processing machine.

In order to solve the above-described problems, an object of the present disclosure is to provide an automatic tool exchanger suitable for saving a space of a multi-functional processing machine.

Solution to Problem

According to an aspect of the present disclosure, there is provided an automatic tool exchanger provided in a multi-functional processing machine in which a tool main spindle device is disposed at a center of an opposed biaxial lathe, the automatic tool exchanger including: a tool magazine configured to be disposed in a machine body front surface upper portion of the multi-functional processing machine and to house multiple tools for exchange with respect to the tool main spindle device; a shift device configured to move the tool between the tool magazine and a tool exchanging position with respect to the tool main spindle device; and a tool changer configured to exchange the tool between the shift device and the tool main spindle device.

Advantageous Effects

With the configuration described above, since the shift device moves the tool between the tool magazine disposed in the machine body front surface upper portion of the multi-functional processing machine and the tool exchanging position with respect to the tool main spindle device, and the tool is exchanged with the tool main spindle device by the tool changer, it is unnecessary to move the tool main spindle device as with conventional art. Since the tool changer is disposed by using a cavity in the machine body front surface upper portion of the multi-functional processing machine and the shift device or the tool changer moves the tool, it is possible to provide the automatic tool exchanger suitable for saving a space of the multi-functional processing machine.

DESCRIPTION OF EMBODIMENTS

Figure 1:
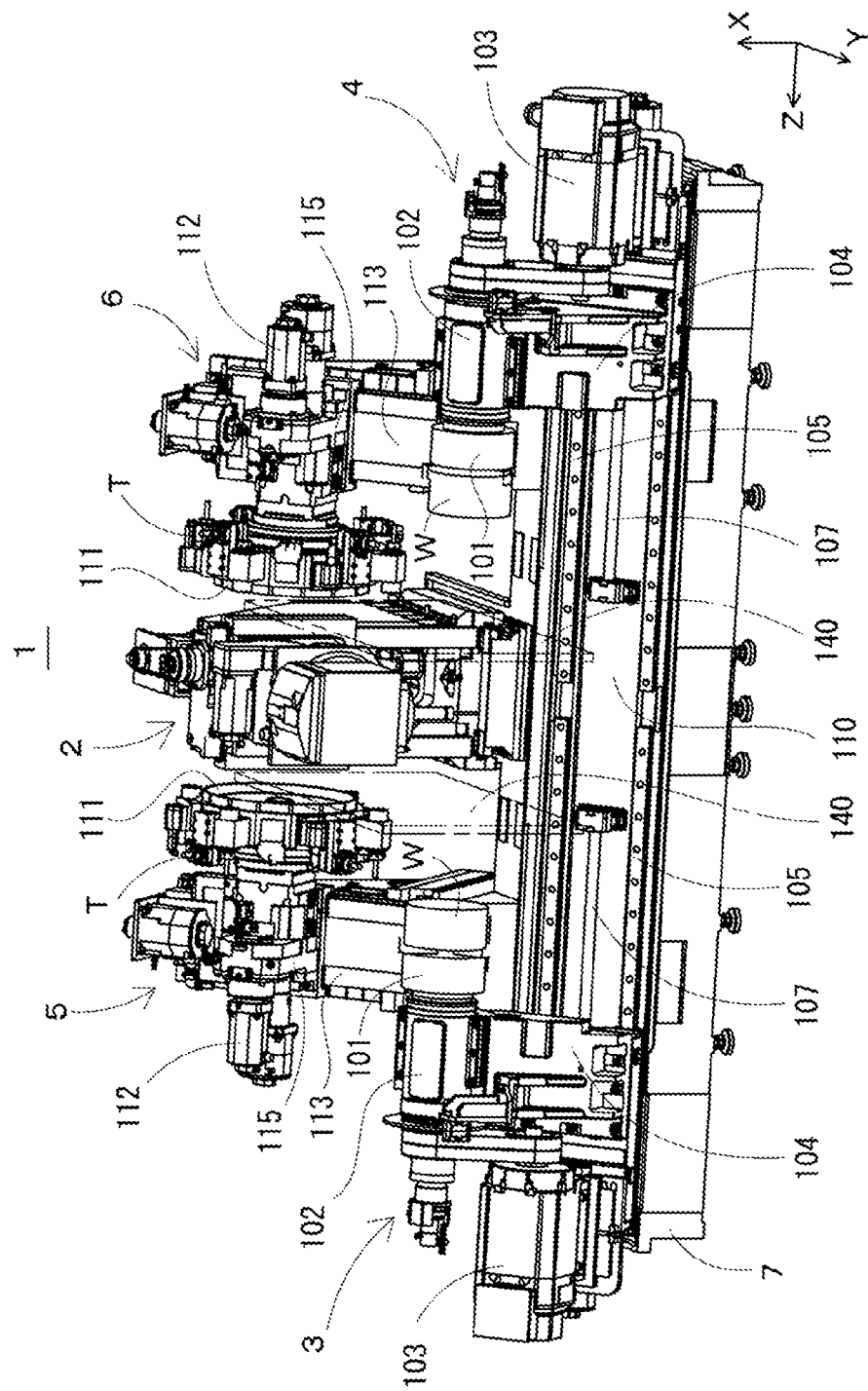
FIG. 1 is a perspective view illustrating a main structure of a multi-functional processing machine.

An embodiment of an automatic tool exchanger according to the present disclosure will be described below with reference to the drawings. The automatic tool exchanger according to the present embodiment is provided in a multi-functional processing machine that is a machine tool having both functions of an NC lathe and a machining center, in the same manner as the conventional example. First, a main portion of the multi-functional processing machine will be described. FIG. 1, FIG. 2, FIG. 3, and FIG. 4 are a perspective view, a front view, a plan view, and a side view illustrating a main structure of the multi-functional processing machine according to the present embodiment.

In multi-functional processing machine 1, first workpiece main spindle device 3 and second workpiece main spindle device 4 that impart rotation to gripped workpiece W, and first turret device 5 and second turret device 6 having multiple tools T corresponding to processing on workpiece W are disposed symmetrically with respect to a left-right direction, respectively. First workpiece main spindle device 3 and second workpiece main spindle device 4 are coaxially disposed such that chuck mechanisms 101 face each other, and first turret device 5 and second turret device 6 respectively serving as tool rests are provided. In addition to such an opposed biaxial lathe, multi-functional processing machine 1 is provided with tool main spindle device 2 for executing processing difficult with the lathe at a machine body center.

In multi-functional processing machine 1, first workpiece main spindle device 3 and second workpiece main spindle device 4, first turret device 5 and second turret device 6, and tool main spindle device 2 are mounted on one base 7. Each device is assembled via a driving device to be able to move in a predetermined direction on base 7. In the present embodiment, a movement direction (movement axis) of each device is defined as follows. First, first workpiece main spindle device 3 and second workpiece main spindle device 4 are designed such that a center line of the main spindle is in a machine body width direction and is horizontal, and the movement direction is in a direction parallel to the main spindle, and is defined as a Z-axis.

Next, both first and second turret devices 5 and 6 and tool main spindle device 2 are configured to move in a machine body front-rear direction and a machine body up-down direction orthogonal to the main spindle. Base 7 of multi-functional processing machine 1 is a so-called slant bed type, and the movement in the machine body front-rear direction is such that tool main spindle device 2 is horizontal, whereas first and second turret devices 5 and 6 are inclined. Therefore, the horizontal machine body front-rear direction, which is the movement direction of tool main spindle device 2, is defined as a Y-axis, and a vertical machine body up-down direction orthogonal to the Y-axis is defined as an X-axis. Further, in order to rotate the held tool, tool main spindle device 2 has a rotation axis parallel to the Y-axis as a B-axis. First and second turret devices 5 and 6 have movement axes in directions obtained by tilting the Y-axis and the X-axis by 45 degrees, and the directions are defined as a YL-axis and an XL-axis, respectively.

In slant bed type base 7, mounting surfaces of first and second workpiece main spindle devices 3 and 4 disposed on a machine body front side are inclined to be low in a front direction, and conversely, mounting surfaces of first and second turret devices 5 and 6 disposed on a machine body rear side are inclined to be low in a rear direction. The front-rear inclination of base 7 is formed with the wide machine body rear side such that positions of the mounting surfaces of first and second turret devices 5 and 6 are higher than the mounting surfaces of first and second workpiece main spindle devices 3 and 4. Multi-functional processing machine 1 of the present embodiment has a structure in which a dimension in the machine body front-rear direction is suppressed by tilting a mounting surface of base 7 in the front-rear direction.

First and second workpiece main spindle devices 3 and 4 (hereinafter, referred to as workpiece main spindle devices 3 and 4 in a case where both devices are commonly described) are configured to be the same, and chuck mechanism 101 for gripping and releasing workpiece W which is a processing target is provided. That is, in workpiece main spindle devices 3 and 4, a spindle is rotatably incorporated in cylindrical main spindle stand 102, and chuck mechanism 101 is assembled to a tip portion of the spindle.

The spindles of workpiece main spindle devices 3 and 4 are arranged in parallel with a rotation axis of spindle motor 103, and are configured such that a belt is bridged via a pulley fixed to each rotation axis and the rotational movement of the spindle motor is transmitted to the spindle via the belt. Accordingly, under the control of spindle motor 103, the rotation is imparted to chuck mechanism 101 assembled to the spindle, so that gripped workpiece W is not only phase-determined at a time of processing but also rotated at a predetermined speed.

Workpiece main spindle devices 3 and 4 are mounted on main spindle slide 104, and are configured to move on base 7 along the Z-axis which is the machine body width direction. As described above, base 7 is formed with front side inclined surface 110 such that the front side is lowered, and two guide rails 105 parallel to the Z-axis are fixed. Guide block 106 is provided on a lower surface of main spindle slide 104 matching the inclination of front side inclined surface 110, and slidably meshes with guide rail 105. Workpiece main spindle devices 3 and 4 are mounted on main spindle slide 104 not to project greatly ahead from front side inclined surface 110 narrower in the machine body front-rear direction such that main spindle stand 102 and spindle motor 103 are vertically positioned.

Workpiece main spindle devices 3 and 4 can move in the Z-axis direction by a ball screw mechanism. Screw shaft 107 parallel to the Z-axis is supported between two guide rails 105 via a bearing. Z-axis servo motor 108 is provided on the outside in the machine body width direction, and a rotation axis of Z-axis servo motor 108 is connected to screw shaft 107. On the other hand, a nut member through which screw shaft 107 passes is fixed to main spindle slide 104, so that main spindle slide 104 is configured to linearly move in the Z-axis direction by the rotational output of Z-axis servo motor 108.

Next, first turret device 5 and second turret device 6 (hereinafter, turret devices 5 and 6 in a case where both devices are commonly described) select corresponding tool T from multiple tools T by revolving indexing, and perform predetermined processing such as cutting on workpiece W. In turret devices 5 and 6, multiple tools T are attached to disk-shaped tool rest 111 at regular intervals in a circumferential direction, and tool rest 111 is configured such that tool T is detachable at arbitrary positions. Turret devices 5 and 6 have indexing servomotor 112 for rotationally controlling tool rest 111, and are configured to be able to position arbitrary tool T at a processing position on a circumference.

Figure 4:
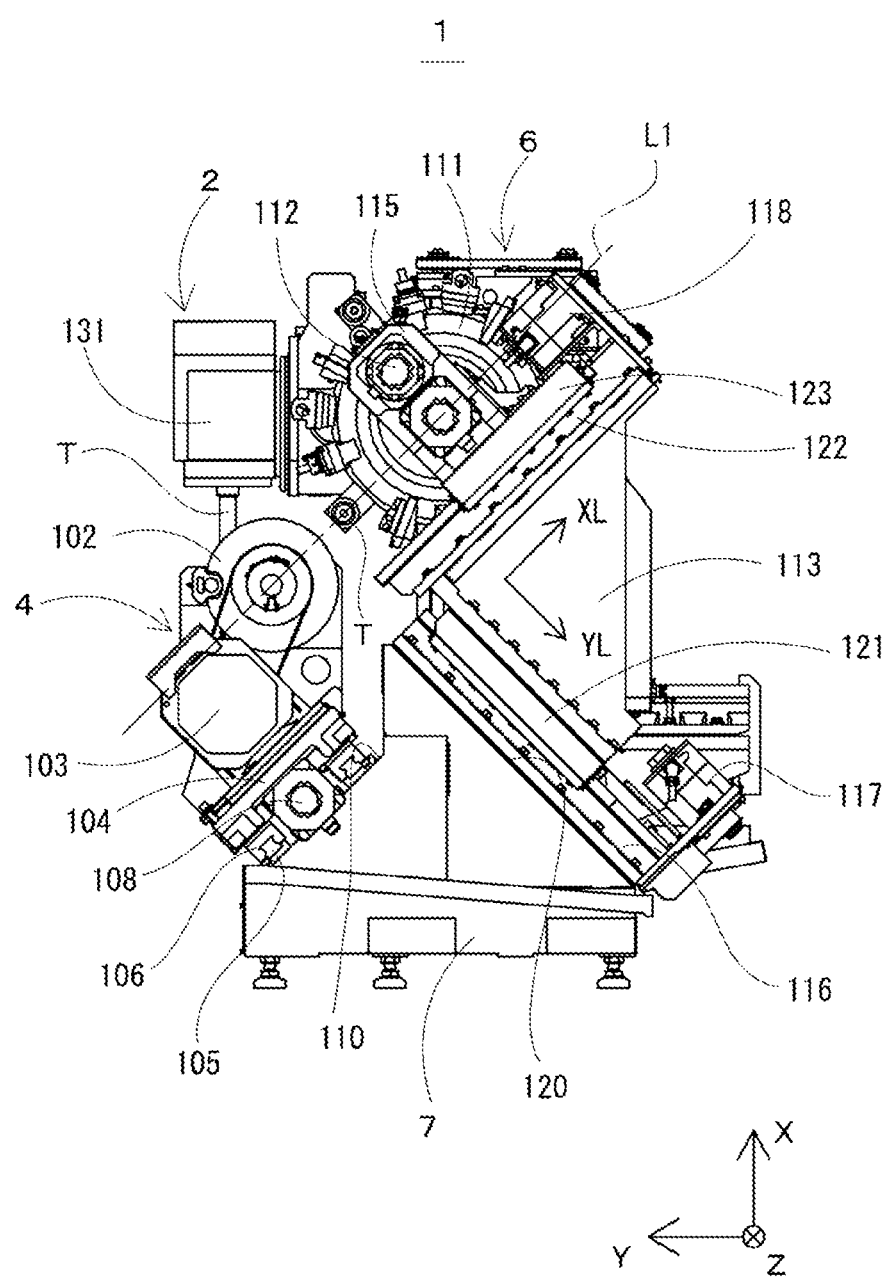
FIG. 4 is a side view illustrating the main structure of the multi-functional processing machine.

Tool T of tool rest 111 is attached such that a tip end of a bite, drill or the like faces an outside side in the machine body width direction, and tool T is brought into contact with oncoming workpiece W from a machine body center side by moving workpiece main spindle devices 3 and 4 in the Z-axis direction. Turret devices 5 and 6 are provided with a driving device for moving tool rest 111 on an XY-plane orthogonal to the Z-axis so as to be able to move tool T to the processing position. In particular, as illustrated in FIG. 4, the movement of tool rest 111 in the present embodiment is in a YL-axis direction and an XL-axis direction having an angle of 45 degrees with respect to the horizontal direction and the vertical direction. Accordingly, rear inclined surface 120 parallel to the YL-axis is formed on base 7, to which base slide 113 is assembled in a movable state.

The YL-axis is high on a machine body front side, and conversely, the XL-axis is low on the front side, that is, toward workpiece main spindle devices 3 and 4. YL-axis guide rail 116 is fixed to rear inclined surface 120 of base 7, and base slide 113 in a substantially triangular shape is slidably assembled. Base slide 113 is provided with guide section 121 that slidably meshes with YL-axis guide rail 116 on one side, and XL-axis guide rail 122 is provided on an adjacent side at 90°. Guide section 123 of turret slide 115 slidably meshes with XL-axis guide rail 122.

Both base slide 113 and turret slide 115 can be moved along the YL-axis or the XL-axis by a ball screw mechanism. A screw shaft parallel to each of YL-axis guide rail 116 and XL-axis guide rail 122 is supported by a bearing, and the screw shaft passes through a nut member fixed to base slide 113 or turret slide 115. Each screw shaft is connected to a rotation axis of YL-axis servo motor 117 or XL-axis servo motor 118, so that base slide 113 and turret slide 115 can be linearly moved by each rotational output. Turret devices 5 and 6 can perform not only the movement control in each direction of the YL-axis and the XL-axis of tool rest 111 by the drive control of YL-axis servo motor 117 and XL-axis servo motor 118, but also the movement control in the horizontal direction in which the movements in both axial directions are combined.

Meanwhile, when turret devices 5 and 6 move indexed tool T to the processing position, position adjustment in the YL-axis direction is performed such that a straight line connecting a rotational center of tool rest 111 and a rotational center of the main spindle in workpiece main spindle devices 3 and 4 is parallel to the XL-axis. At this time, the straight line connecting both rotational centers is defined as processing movement line L1. Accordingly, tool T of tool rest 111 is disposed on processing movement line L1 by revolving indexing, and is positioned for processing on workpiece W by the movement in the XL-axis direction.

Figure 5:
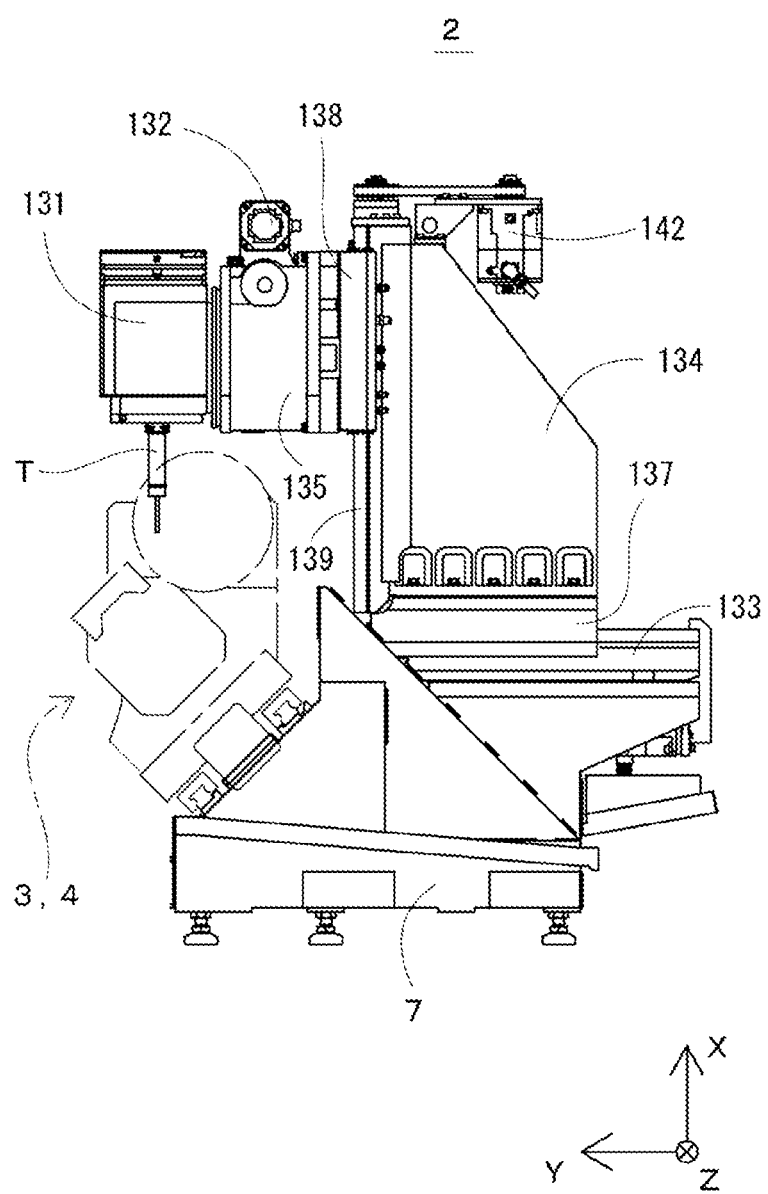
FIG. 5 is a side view illustrating a tool main spindle device.

In multi-functional processing machine 1, tool main spindle device 2 is provided at a machine body center portion so as to handle processing on workpiece W that cannot be performed by turret devices 5 and 6. Here, FIG. 5 is a side view illustrating tool main spindle device 2. In addition to lathe processing, tool main spindle device 2 can perform drilling processing or the like on workpiece W gripped by workpiece main spindle devices 3 and 4, and workpiece processing at a depth or an angle, which cannot be performed by turret devices 5 and 6, can be performed.

In the same manner as turret devices 5 and 6, tool main spindle device 2 has a driving device for moving tool T on the XY-plane orthogonal to the Z-axis, and an angle of tool T can be further adjusted with the B-axis having a rotational center horizontal in the Y-axis direction. In tool main spindle device 2, a servomotor for a main spindle or a tool spindle is incorporated inside main spindle head 131, and various tools T housed in automatic tool exchanger 8 (refer to FIG. 6) can be replaced with a tool attachment portion provided at a lower end portion of main spindle head 131. Main spindle head 131 is rotatably attached to main spindle slide 135, and is configured to transmit the rotation of B-axis servo motor 132 via a rotation transmission mechanism.

In tool main spindle device 2, guide rail 133 is fixed on base 7 such that main spindle head 131 can be moved in the Y-axis direction, which is the machine body front-rear direction, and base slide 134 is slidably assembled to guide rail 133. In base slide 134, guide section 137 and rail portion 139 are configured with an angle of 90°. Guide section 137 slidably meshes with guide rail 133, and guide section 138 of main spindle slide 135 slidably meshes with rail portion 139.

Both base slide 134 and main spindle slide 135 can be moved in the Y-axis direction and the X-axis direction by a ball screw mechanism. In the ball screw mechanism, a screw shaft disposed in each axial direction is supported via a bearing, and the screw shaft passes through a nut member fixed to base slide 134 or main spindle slide 135. Y-axis servo motor 141 (refer to FIG. 3) or X-axis servo motor 142 is connected to each screw shaft, and base slide 134 or main spindle slide 135 can be linearly moved by the rotational output. Accordingly, in tool main spindle device 2, positioning of tool T is performed by the drive control of Y-axis servo motor 141 and X-axis servo motor 142, and a posture (angle) of tool T with respect to workpiece W is adjustable by the drive control of B-axis servo motor 132.

In multi-functional processing machine 1 of the present embodiment, workpiece W is charged to first workpiece main spindle device 3 by workpiece automatic conveyance machine 9, and is discharged from second workpiece main spindle device 4. The transfer of workpiece W from first workpiece main spindle device 3 to second workpiece main spindle device 4 is directly performed by both devices. In such multi-functional processing machine 1, it is possible to process workpiece W simultaneously with first workpiece main spindle device 3 and second workpiece main spindle device 4, and also simultaneously perform conveyance of workpiece W while workpiece W is being processed on the one hand, tool exchange with respect to tool main spindle device 2 during processing, and the like. Meanwhile, the conveyance and processing of workpiece W, as well as the exchange of tool T in tool main spindle device 2 are performed at a position closer to a machine body front side center portion. Therefore, it is necessary to prevent each device from being affected by coolant used during processing, shavings or chips generated by processing, and the like.

Figure 2:
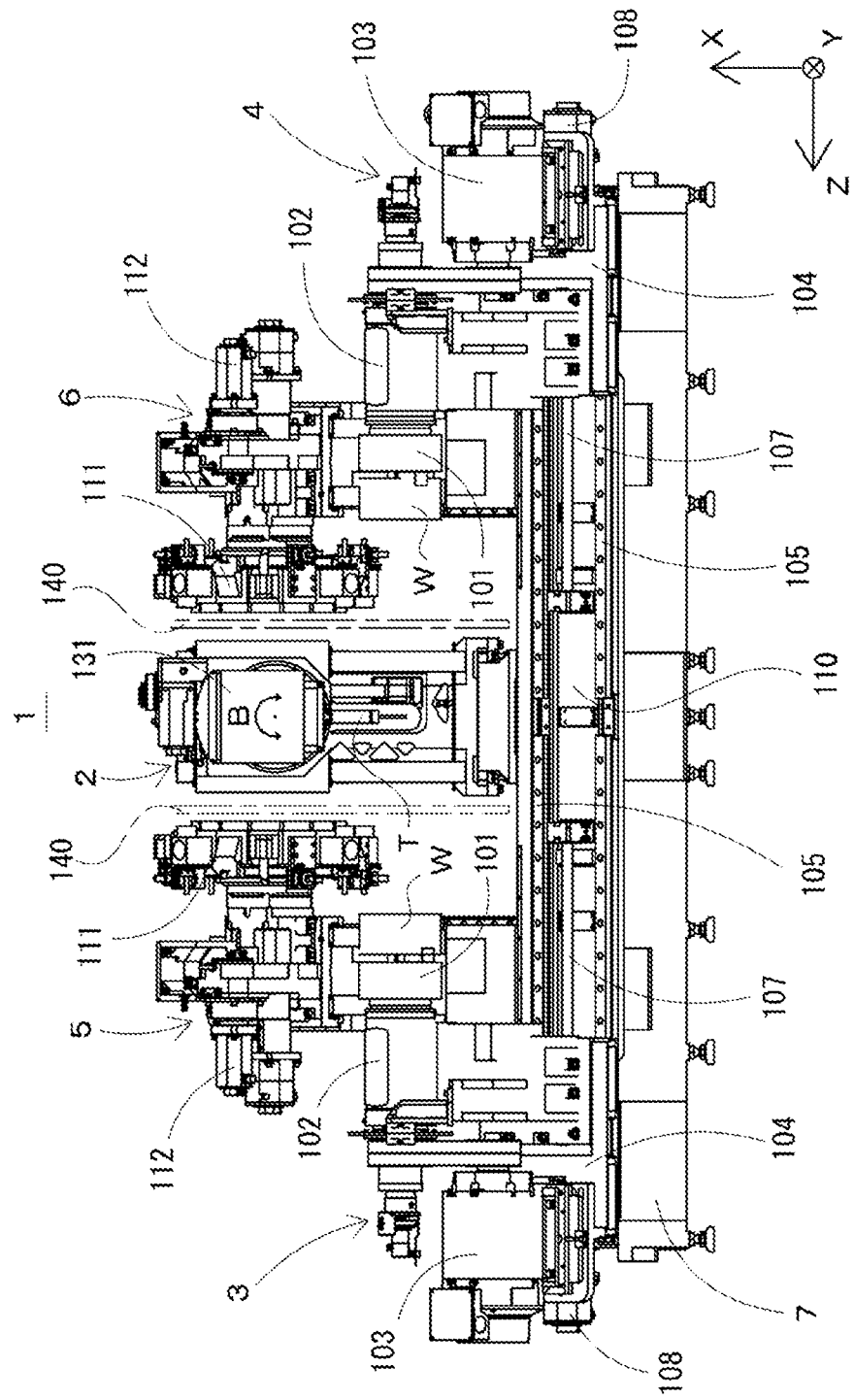
FIG. 2 is a front view illustrating the main structure of the multi-functional processing machine.
Figure 3:
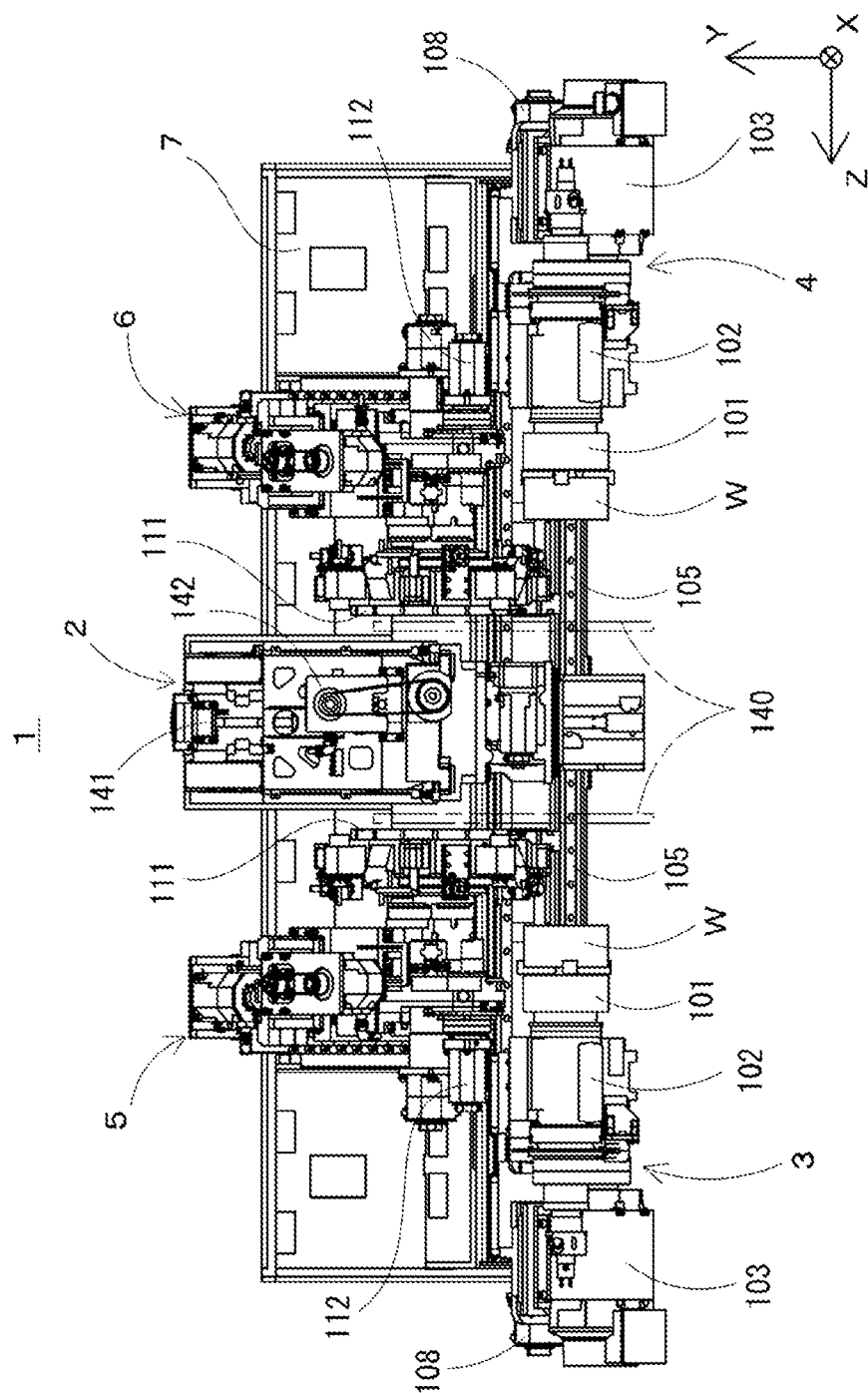
FIG. 3 is a plan view illustrating the main structure of the multi-functional processing machine.

In this regard, as illustrated in FIGS. 1 to 3, multi-functional processing machine 1 is provided with two separation shutters 140. Separation shutter 140 partitions a processing chamber in which workpiece W is processed in the machine body width direction, and can be divided into a first processing space by first workpiece main spindle device 3 and the turret device 5, a second processing space by second workpiece main spindle device 4 and second turret device 6, and a tool exchange space to be performed on tool main spindle device 2. Two separation shutters 140 are configured to be horizontally moved in the machine body front-rear direction by a driving device.

In multi-functional processing machine 1, workpiece W is processed by the following flow. Workpiece W gripped by first workpiece main spindle device 3 is processed with first processing by first turret device 5, and then transferred to second workpiece main spindle device 4. In second workpiece main spindle device 4, second processing by second turret device 6 is executed on an opposite face of workpiece W on which the first processing is performed. In the first processing and the second processing, processing using tool main spindle device 2 is performed as required in addition to first turret device 5 or the like.

Specifically, workpiece W of an input side stocker is taken out by workpiece automatic conveyance machine 9, is conveyed to first workpiece main spindle device 3, and is gripped by chuck mechanism 101. In first turret device 5, revolving indexing of tool T to be used for processing workpiece W is performed from multiple tools T by the driving of tool rest 111. Turret slide 115 moves to first workpiece main spindle device 3, and tool T enters the processing position with respect to workpiece W and is positioned. Base slide 113 at this time is positioned in the YL-axis direction such that indexed tool T is moved on processing movement line L1.

After tool T is positioned at the processing position, workpiece W gripped by chuck mechanism 101 is rotated by the driving of spindle motor 103, and main spindle slide 104 moves along guide rail 105 in the Z-axis direction, so that tool T is brought into contact with workpiece W to perform predetermined processing. For example, in a case where boring processing is performed on workpiece W, tool T, which is a bite, is relatively directed to workpiece W, and cutting is performed with a cutting edge in contact with an inner surface of a hole formed in workpiece W.

In the first processing of workpiece W by first workpiece main spindle device 3, in addition to processing by first turret device 5, processing by adding tool main spindle device 2 or processing by only tool main spindle device 2 is performed. In a case where processing is performed on workpiece W by tool main spindle device 2, tool rest 111 is retreated by the movement in the XL-axis direction so as to be separated from first workpiece main spindle device 3. In tool main spindle device 2, main spindle head 131 is positioned in the machine body front-rear direction and the machine body up-down direction by the movement of base slide 134 in the Y-axis direction and the movement of main spindle slide 135 in the X-axis direction. An angle of tool T is adjusted by the rotation of the B-axis of main spindle head 131.

Tool main spindle device 2 which completes the predetermined first processing on workpiece W is returned to a rearward movement position by the movement of main spindle head 131 in the Y-axis direction and the X-axis direction. Next, in order to move workpiece W from first workpiece main spindle device 3 to second workpiece main spindle device 4, both devices approach the machine body center, second workpiece main spindle device 4 picks up workpiece W with respect to first workpiece main spindle device 3 which stops previously, and workpiece W is gripped and replaced by chuck mechanisms 101. A processing target of workpiece W gripped by second workpiece main spindle device 4 is a secondary processing surface side of a back side at which the first processing is performed. In the second processing, in the same manner as first turret device 5, the second processing by second turret device 6 is executed on workpiece W, or processing by tool main spindle device 2 is performed, or processing by only tool main spindle device 2 is performed.

Workpiece W for which the second processing is completed is taken out by workpiece automatic conveyance machine 9, and is collected in an output side stocker. In multi-functional processing machine 1 of the present embodiment, the processing by first turret device 5 and tool main spindle device 2 is performed in the first processing, and the processing by second turret device 6 and tool main spindle device 2 is also performed in the second processing, so that the number of steps in each processing can be increased and multiple pieces of processing can be performed on workpiece W in a short time.

Meanwhile, in multi-functional processing machine 1 of the present embodiment, first and second workpiece main spindle devices 3 and 4, first and second turret devices 5 and 6, and tool main spindle device 2 are configured to be compact on slant bed type base 7, so that space-saving is enabled. In particular, multi-functional processing machine 1 is designed such that the dimension in the machine body front-rear direction is suppressed, and a moving range of each device is narrowed. That is, a center portion on a machine body front side of multi-functional processing machine 1 serves as the processing chamber, and each device is configured to move between a retracted position and a processing position in a narrow cavity. Accordingly, even in tool main spindle device 2 requiring exchange of tool T, main spindle head 131 can move only a small distance in the front-rear direction and the up-down direction of the machine body.

Since various tools T are used in tool main spindle device 2 according to processing contents on workpiece W, multi-functional processing machine 1 requires an automatic tool exchanger that can automatically change corresponding tool T from a tool magazine housing multiple tools T. Meanwhile, multi-functional processing machine 1 intended to save space cannot be configured such that an automatic tool exchanger is disposed at a distant position on base 7 as in the conventional example and tool main spindle device 2 is moved thereto. Therefore, in the present embodiment, automatic tool exchanger 8 having a structure for exchanging tool T with respect to tool main spindle device 2 is provided so as not to impair the effect of multi-functional processing machine 1 in which first workpiece main spindle device 3 or the like is disposed in a compact manner.

Figure 6:
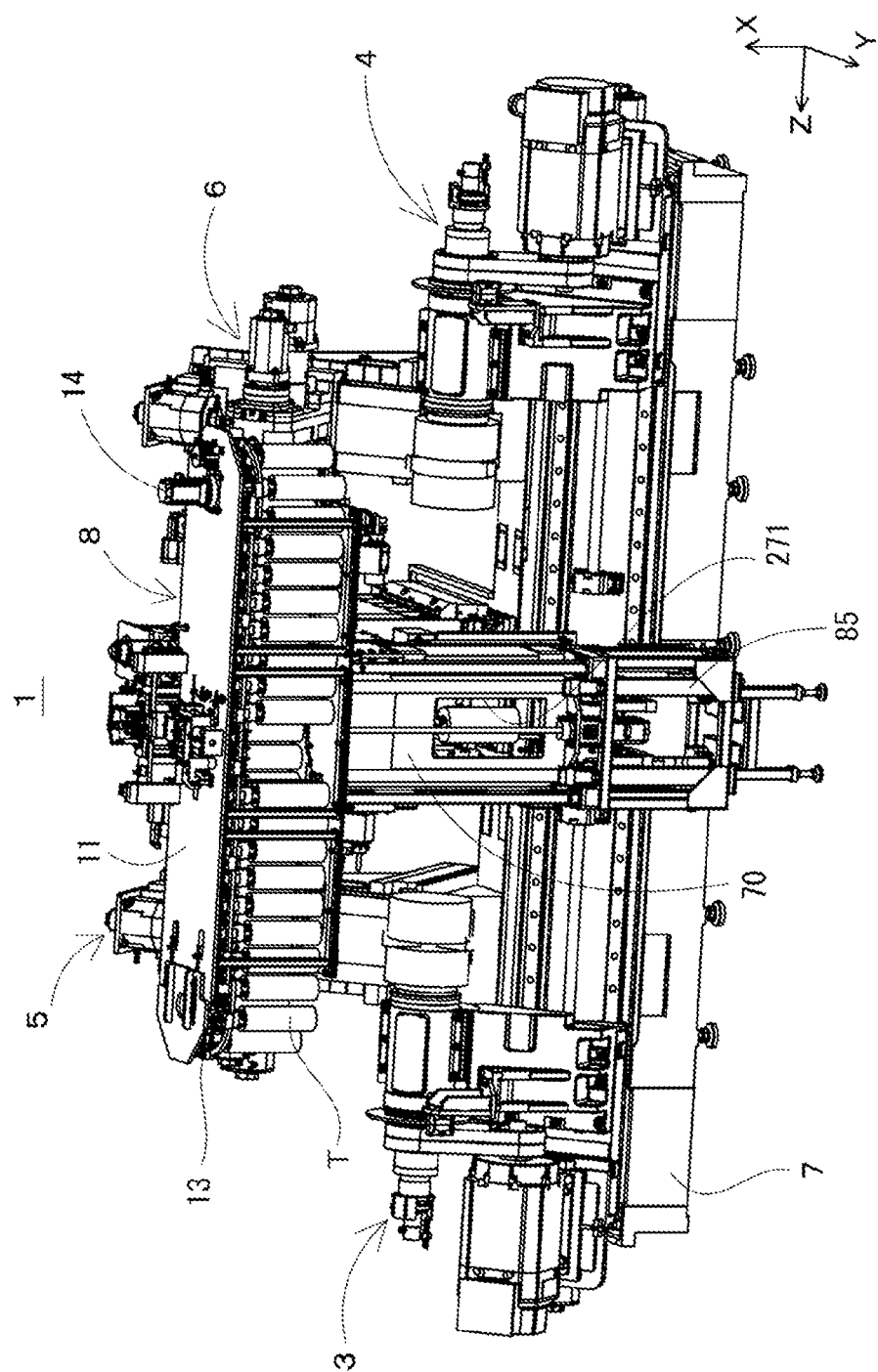
FIG. 6 is a perspective view illustrating an embodiment of an automatic tool exchanger provided in the multi-functional processing machine.
Figure 7:
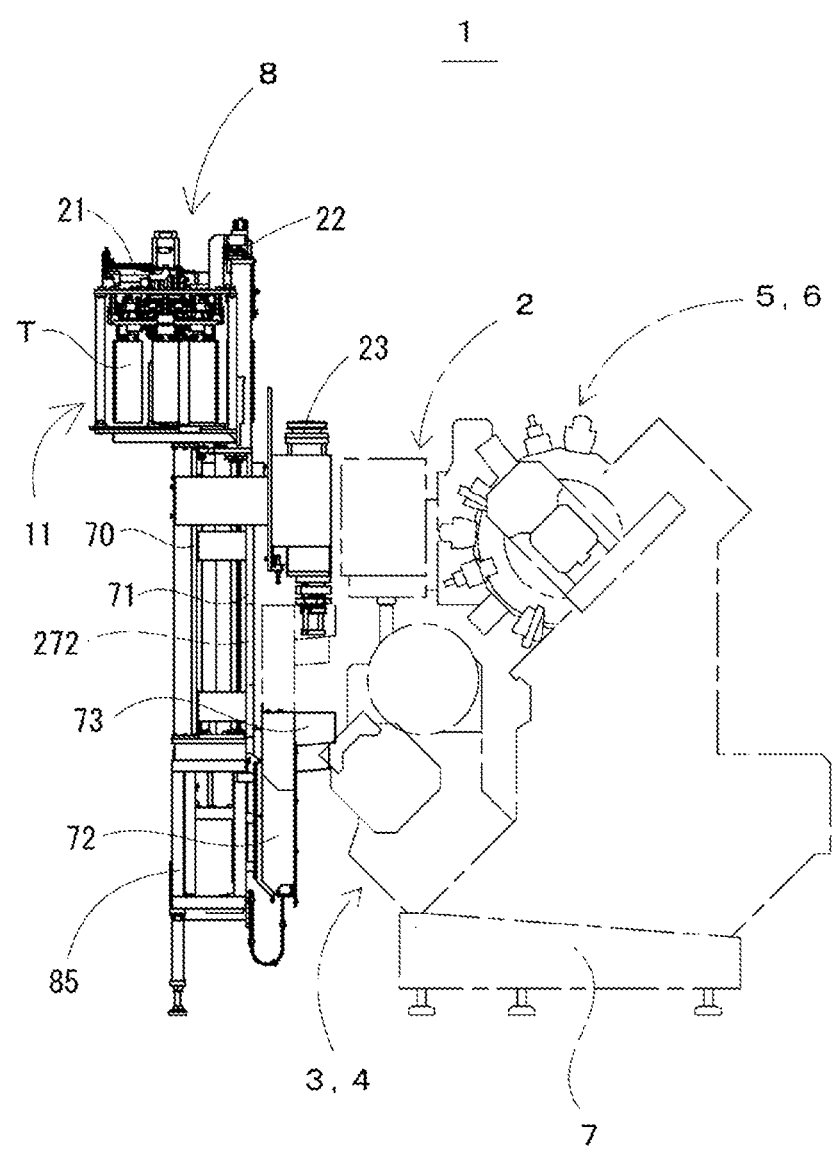
FIG. 7 is a side view illustrating a positional relationship of the automatic tool exchanger in the multi-functional processing machine.

FIG. 6 is a perspective view illustrating an embodiment of an automatic tool exchanger provided in multi-functional processing machine 1. FIG. 7 is a side view illustrating a positional relationship of the automatic tool exchanger in multi-functional processing machine 1. Automatic tool exchanger 8 is disposed at a machine body front portion center of multi-functional processing machine 1, and in particular, tool magazine 11 in which multiple tools T are housed in an indexable manner is provided at a machine body upper portion. Automatic tool exchanger 8 is configured to change tool T with respect to tool main spindle device 2, and is provided with a shift device for moving tool T between tool magazine 11 located in the machine body upper portion and main spindle head 131 located at a lower position.

Figure 8:
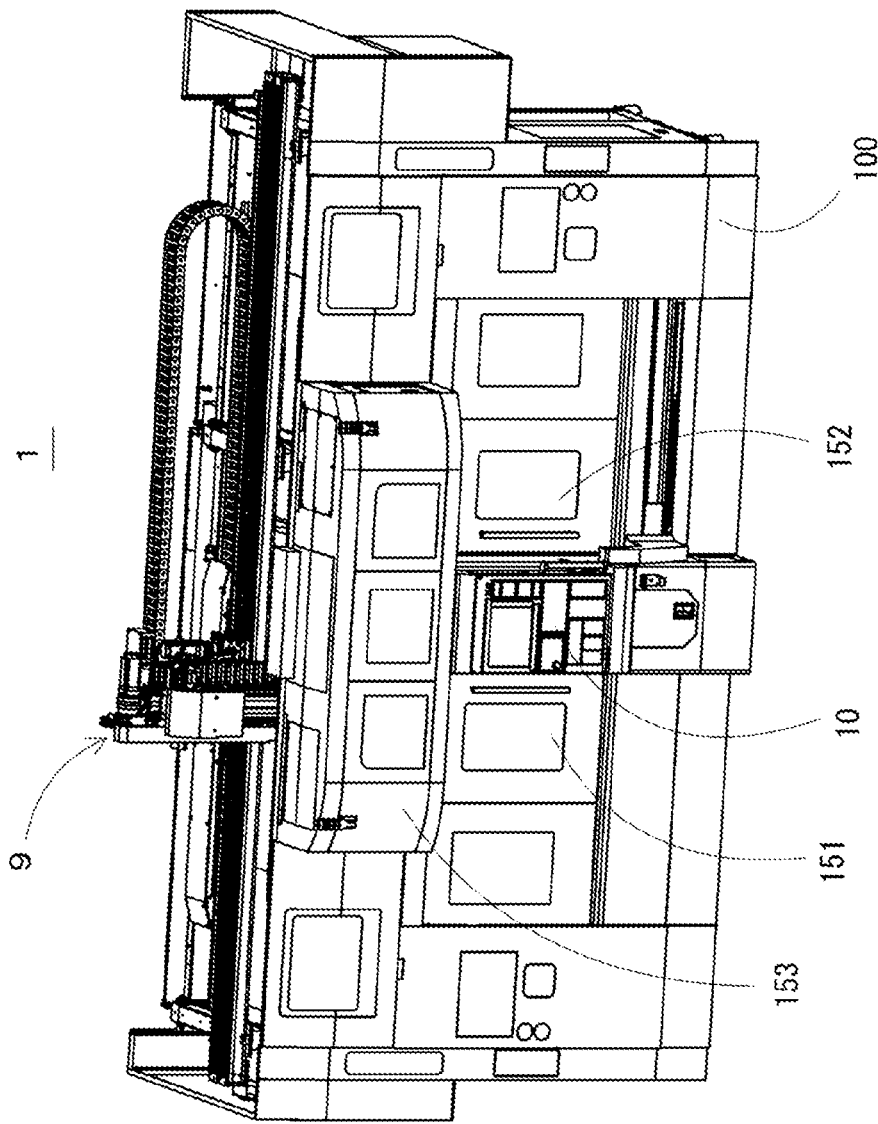
FIG. 8 is an appearance perspective view of the multi-functional processing machine.

Here, FIG. 8 is an appearance perspective view of entire multi-functional processing machine 1. In multi-functional processing machine 1, not only first workpiece main spindle device 3 or the like on base 7 but also automatic tool exchanger 8 or workpiece conveyance device 9 are covered by machine body cover 100 as illustrated in FIG. 8. Gantry-type workpiece automatic conveyance machine 9 is provided so as to project upward from machine body cover 100, and is configured to move workpiece W gripped inside the machine body in three axial directions. Operation panel 10 is provided at a center of a machine body front surface, and left front door 151 and right front door 152 are formed on both left and right sides of operation panel 10. Tool main spindle device 2 is located behind operation panel 10, and the processing chamber for processing workpiece W gripped by first workpiece main spindle device 3 and second workpiece main spindle device 4 is provided behind left front door 151 and right front door 152. Automatic tool exchanger 8 is disposed such that tool magazine 11 projects ahead of left and right front doors 151 and 152 on the machine body front surface, and is covered by magazine cover 153.

Figure 9:
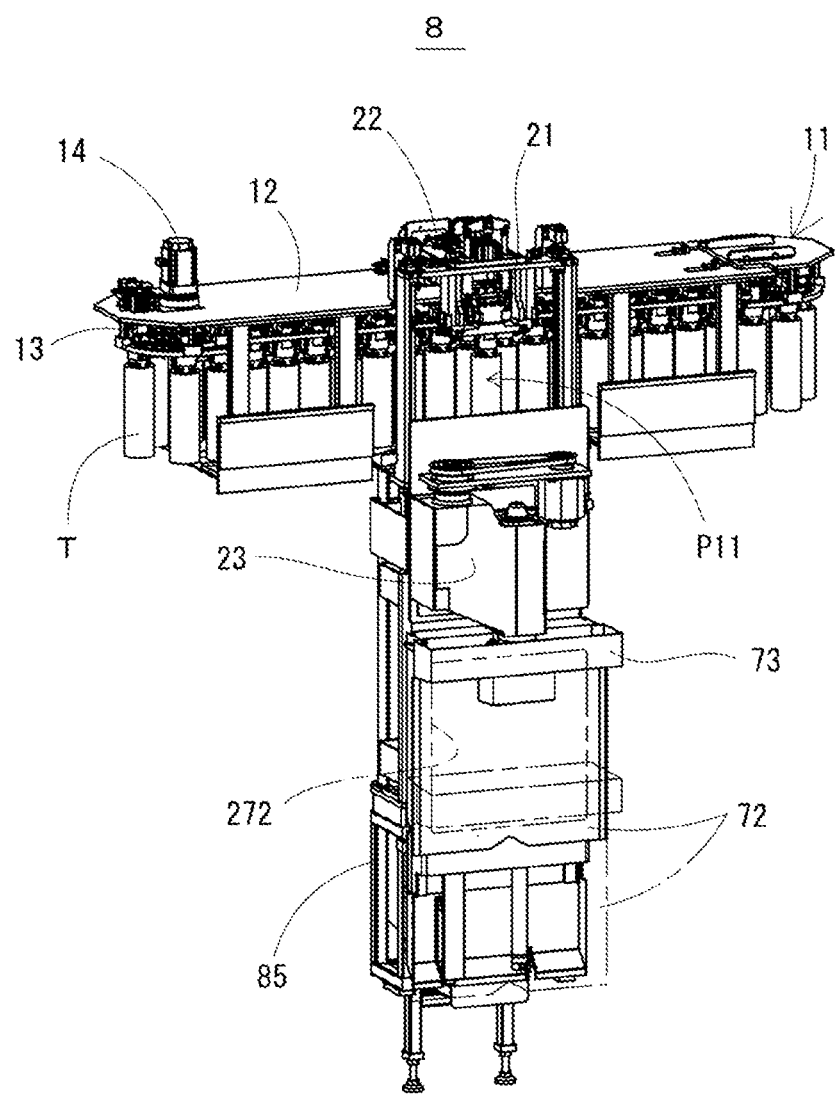
FIG. 9 is a perspective view of the automatic tool exchanger as seen from a machine body rear side (opposite side of FIG. 6).

FIG. 9 is a perspective view illustrating automatic tool exchanger 8 as seen from a machine body rear side (opposite side of FIG. 6). Tool magazine 11 of automatic tool exchanger 8 is configured to be attached such that multiple tools T are suspended on top plate 12, and to move corresponding tool T to indexing position P11 provided at a center. Top plate 12 is long in the machine body width direction, and a pair of sprockets are provided on both end portions in the longitudinal direction on the lower side thereof, and endless roller chain 13 is bridged. Tool magazine 11 is provided with indexing servomotor 14 on one of the pair of sprockets, and the rotation thereof is transmitted to roller chain 13 via a deceleration device.

A detachable tool holder 15 (refer to FIG. 11) is attached to tool T, so that tool T can be held by roller chain 13 and can be held by a shift device that conveys tool T between tool magazine 11 and tool main spindle device 2. Tool holder 15 is a cap-shaped member fitted to a head portion of tool T, and is shaped so as to enable handling of tool T in roller chain 13 or the shift device. Although tools T illustrated in each drawing are all cylindrical in shape, this is merely represented by omitting various tools T without specifically illustrating tool T.

In roller chain 13, multiple pot holders 201 (refer to FIG. 11) for holding such tool holder 15 are formed at regular intervals. Pot holder 201 is a claw member that sandwiches side portions of tool holder 15 at two locations above and below from both sides, and projects horizontally toward an outer peripheral side of roller chain 13. Tool holder 15 has a side face on which groove-shaped gripping portion 202 into which pot holder 201 of tool holder 15 enters is formed so as to be caught by roller chain 13. Therefore, multiple tools T housed in tool magazine 11 are attached to annular roller chain 13 and arranged at regular intervals along a movement line in an oval shape, so that tool T can be removed toward an outside of a circumference.

Tool T to which tool holder 15 is fitted is held by roller chain 13 in a suspended posture with a processing section such as a cutting edge facing downward. The shift device of automatic tool exchanger 8 conveys such tool T to a tool exchanging position with respect to tool main spindle device 2 in the suspended posture as it is. The shift device is configured with front-rear shifter 21 for attaching and detaching tool T with respect to roller chain 13, and up-down shifter 22 for moving tool T to the tool exchanging position. In automatic tool exchanger 8, tool changer 23 is provided at the tool exchanging position so as to change tool T between main spindle head 131 and up-down shifter 22.

Figure 10:
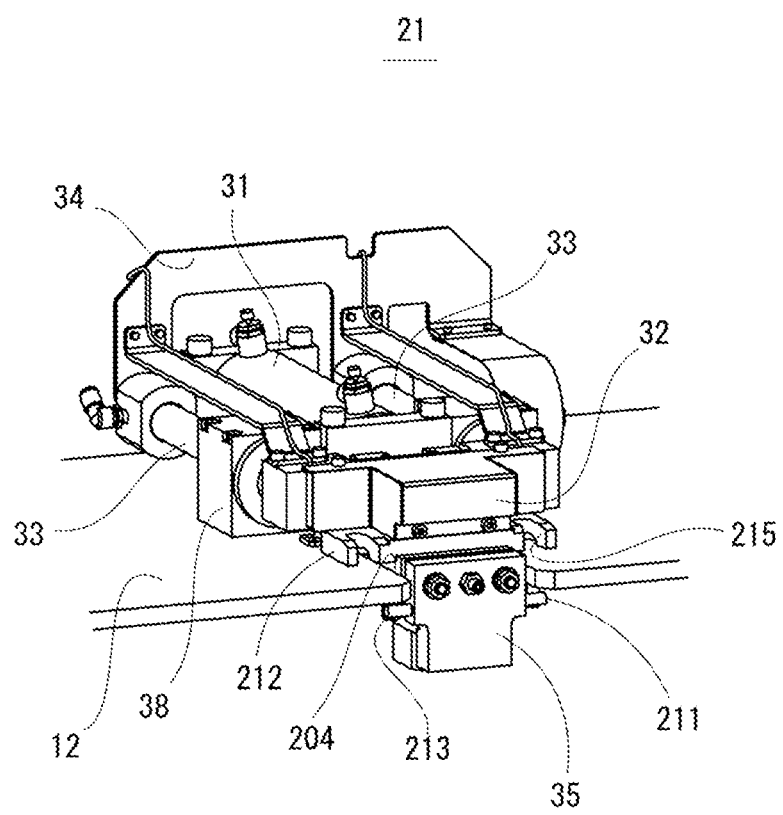
FIG. 10 is a perspective view illustrating a front-rear shifter.
Figure 11:
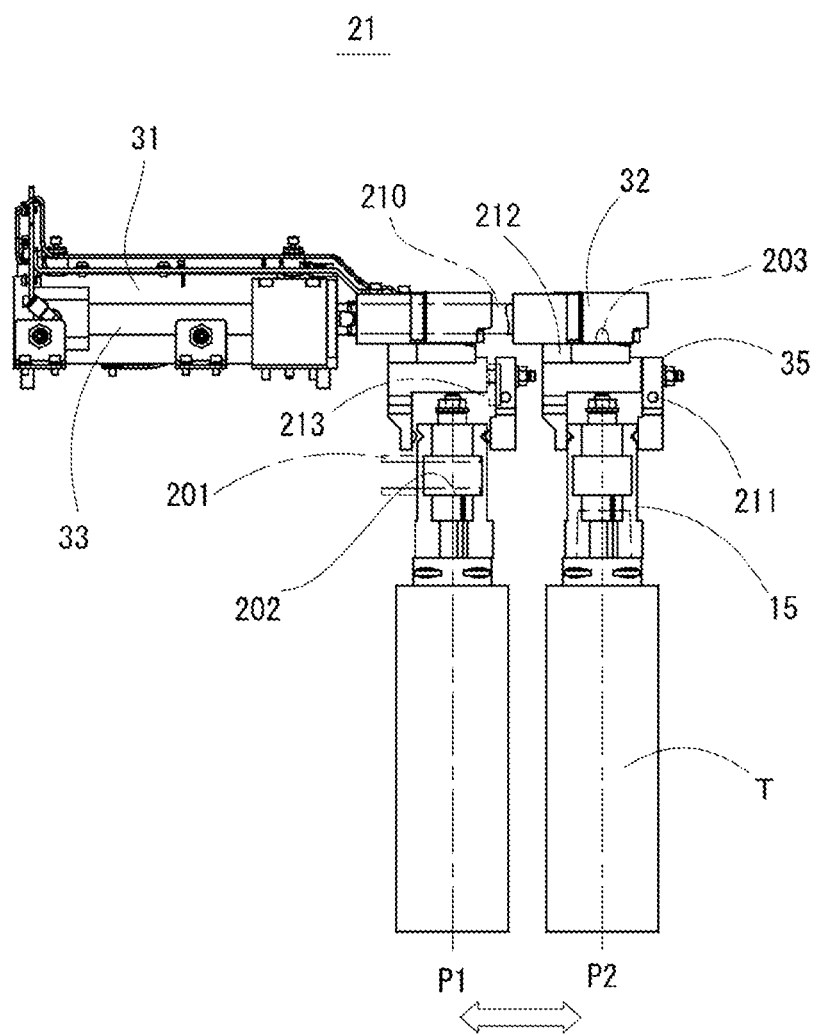
FIG. 11 is a side view illustrating movement of a tool by the front-rear shifter.

FIGS. 10 and 11 are diagrams illustrating front-rear shifter 21, in particular, FIG. 10 is a perspective view of front-rear shifter 21 assembled on top plate 12, and FIG. 11 is a side view illustrating movement of tool T by front-rear shifter 21. Front-rear shifter 21 is assembled to an upper portion center of tool magazine 11. In front-rear shifter 21, air cylinder 31 with piston rod 210 projecting in a rear direction of the machine body (on the right in FIG. 7) is fixed to top plate 12 via support block 38 and pot clamper head 32 is fixed to a tip end of piston rod 210. Two guide rods 33 parallel to air cylinder 31 penetrate the support block 38, and guide means is configured such that one end is fixed to pot clamper head 32 and the other end is fixed to plate 34. Accordingly, pot clamper head 32 is moved in a front-rear direction by the expansion and contraction of air cylinder 31, so that a posture at a time of the movement is maintained by guide rod 33.

Figure 12:
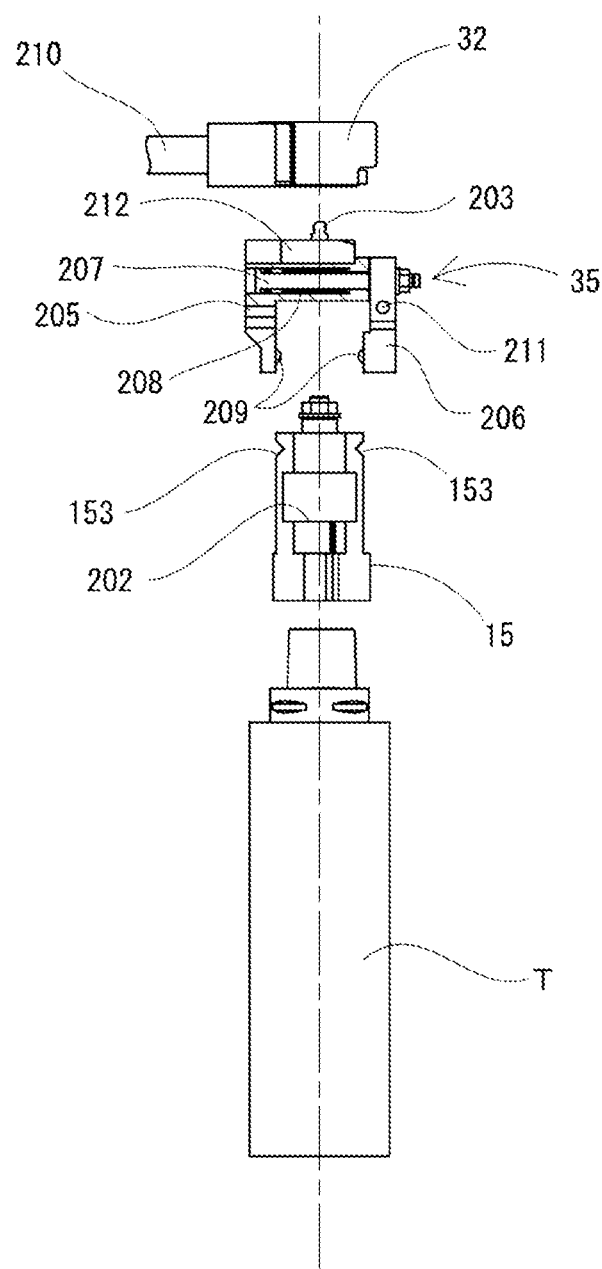
FIG. 12 is a side view illustrating a separation state of each detachable component from a pot clamper head to a tool.

FIG. 12 is a side view in a separation state illustrating each detachable component from pot clamper head 32 to tool T. By enabling the attachment and detachment of each component, it is possible to transfer tool T between tool magazine 11 and tool main spindle device 2 multiple times. Front-rear shifter 21 has a structure in which pot clamper 35 is detachable from pot clamper head 32. Pot clamper 35 is fixed such that pull bolt 203 projects from an upper surface thereof, and pot clamper head 32 is provided with a pull clamp that detachably grips pull bolt 203 at a lower surface portion thereof.

As illustrated in FIG. 11, front-rear shifter 21 moves tool T between front-rear conversion position P1 and up-down conversion position P2. Front-rear conversion position P1 is indexing position P11 illustrated in FIG. 9, and is a position at which the movement of tool T in a circumferential direction by roller chain 13 and the movement of tool T in the machine body front-rear direction by front-rear shifter 21 are switched. As illustrated in FIG. 10, notch portion 204 is formed in top plate 12 at front-rear conversion position P1, and pot clamper 35 disposed therein stands by in a state at front-rear conversion position P1 illustrated on the left side in FIG. 11 so as to clamp tool holder 15 of indexed tool T.

As illustrated in FIG. 12, pot clamper 35 is assembled in a state in which plate-shaped movable block 206 is displaceable in the front-rear direction with respect to L-shaped fixed block 205 by support pin 207. Inside fixed block 205, support pin 207 is biased by clamp spring 208, so that movable block 206 is constantly pulled toward fixed block 205. Fixed block 205 and movable block 206 are formed with clamp projections 209 on opposite inner surfaces, and clamp grooves 153 into which clamp projections 209 are fitted are formed on both front-rear sides of tool holder 15. Accordingly, at up-down conversion position P2 illustrated on the right side of FIG. 11, tool holder 15 is held so as to be gripped by pot clamper 35 by the biasing force of clamp spring 208.

Locking pin 211 projects on both sides in a lateral direction orthogonal to the movement direction of movable block 206, so that locking pin 211 is brought into contact with stopping pin 213 projecting downward from top plate 12 at front-rear conversion position P1. Accordingly, at front-rear conversion position P1 illustrated on the left side of FIG. 11, in a case of movement from up-down conversion position P2 side, locking pin 211 is in contact with stopping pin 213, movable block 206 cannot approach fixed block 205, so that pot clamper 35 becomes in an open state. Further, in a case of movement to front-rear conversion position P1, pot holder 201 is fitted into gripping portion 202, so that tool T is in a state of being held by roller chain 13 via tool holder 15.

On the other hand, at up-down conversion position P2, the movement of tool T to be conveyed in the machine body front-rear direction by front-rear shifter 21 and the movement of tool T in the machine body up-down direction by up-down shifter 22 are switched. At this position, the transfer of tool T by front-rear shifter 21 and up-down shifter 22 is performed by the attachment and detachment of pot clamper head 32 and pot clamper 35. Pot clamper 35 is configured to be gripped by up-down shifter 22 side. That is, pot clamper 35 has gripping block 212 projecting on both sides in the lateral direction in the same manner as locking pin 211, and U-shaped notch portion 215 is formed in the projecting portion as illustrated in FIG. 10. Clamp pin 43 (refer to FIG. 15) enters notch portion 215, so that pot clamper 35 can be gripped by up-down shifter 22.

Figure 13:
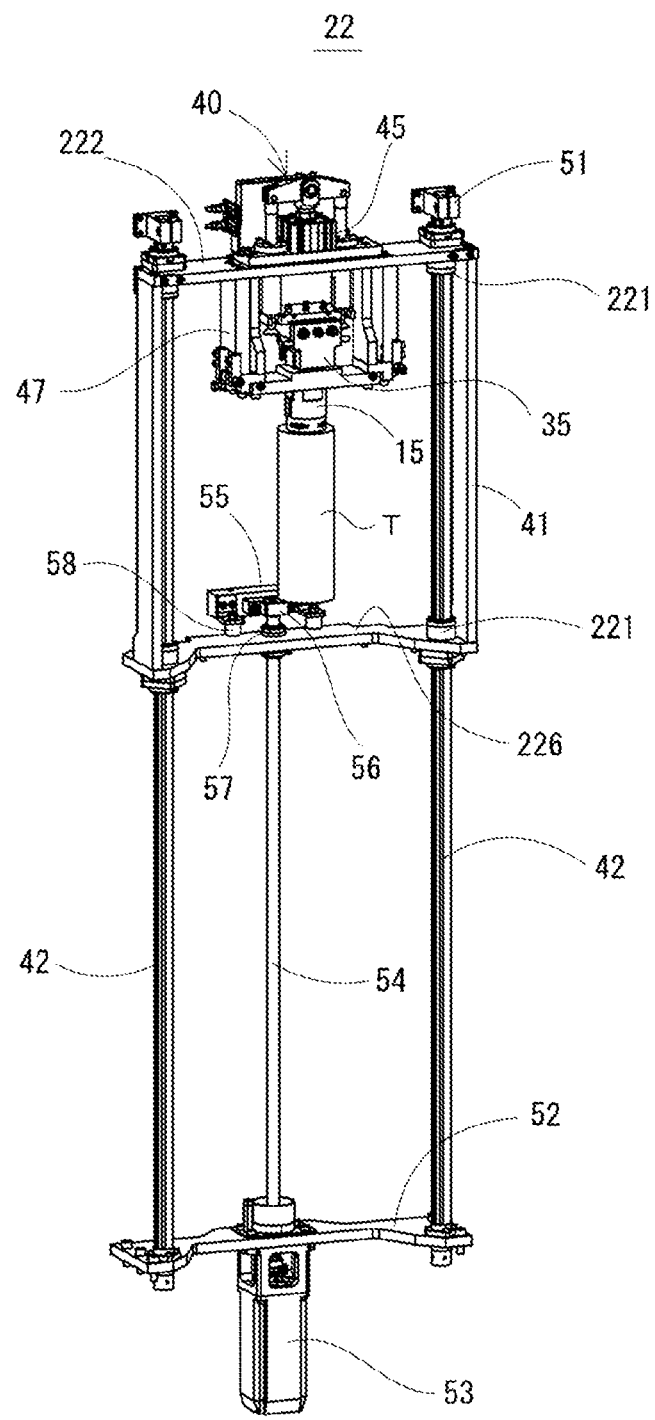
FIG. 13 is a perspective view illustrating a lifting operation of the up-down shifter.
Figure 14:
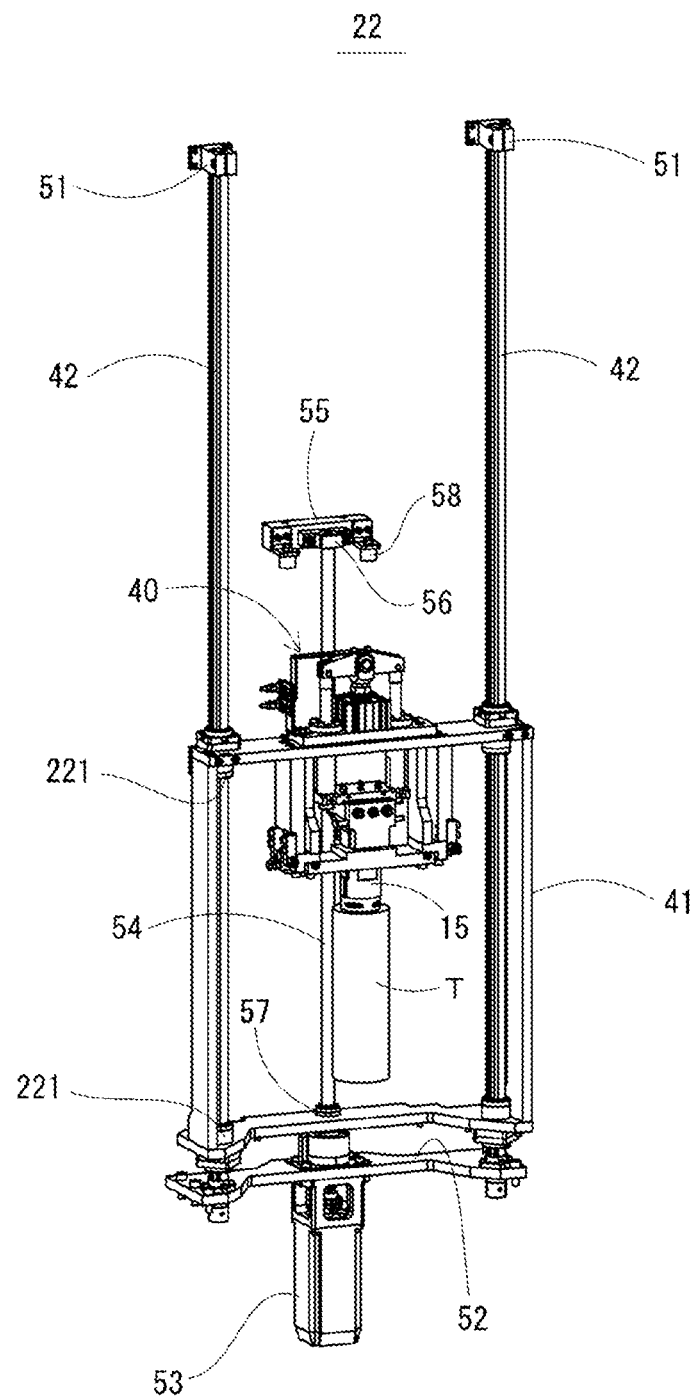
FIG. 14 is a perspective view illustrating a lowering operation of the up-down shifter.
Figure 15:
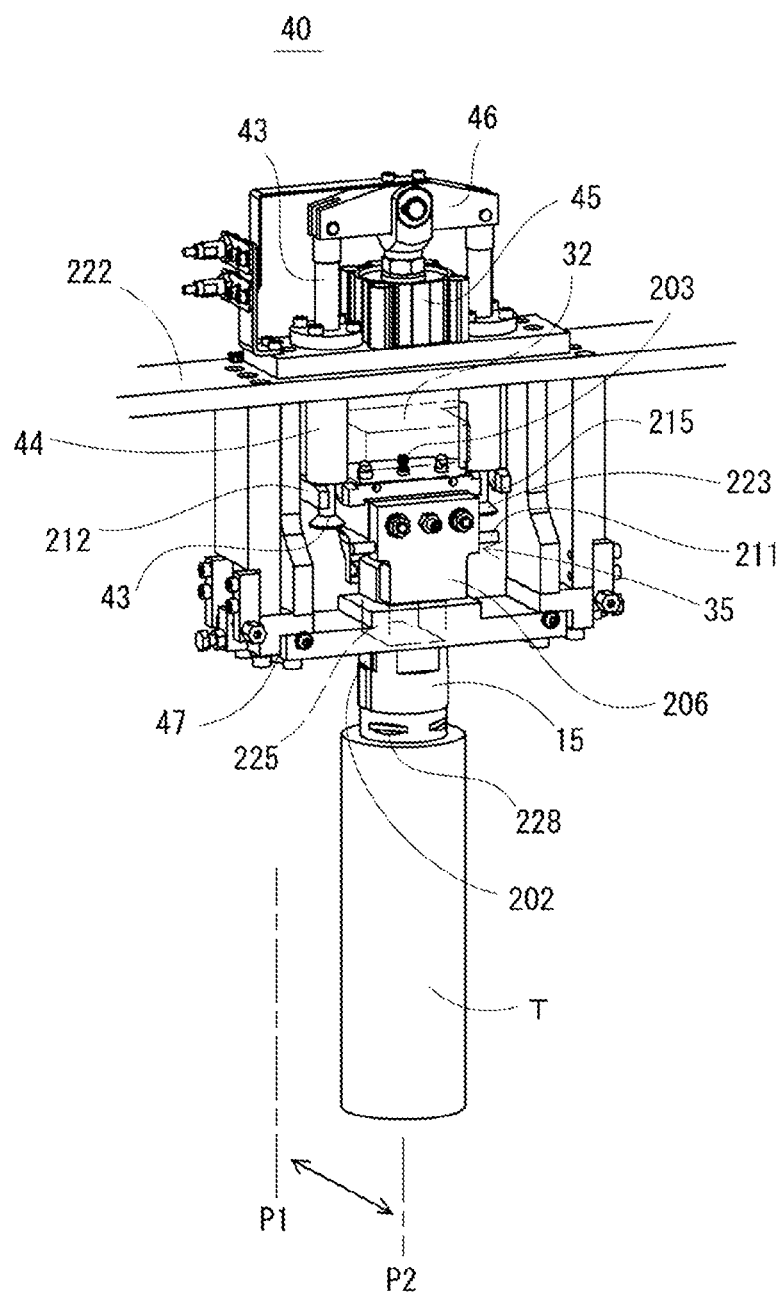
FIG. 15 is a perspective view illustrating a clamp portion of the up-down shifter.

FIGS. 13 and 14 are perspective views illustrating up-down shifter 22, in which a lifted position and a lowered position in tool conveyance are illustrated. In addition, FIG. 15 is a perspective view illustrating clamp portion 40 of up-down shifter 22. Lifting and lowering frame 41 includes clamp portion 40, so up-down shifter 22 moves up and down according to vertical guide rail 42. Two guide rails 42 are supported by upper block 51 and lower plate 52 fixed to framework 85 side of automatic tool exchanger 8, and lifting and lowering frame 41 is configured such that guide rail 42 slides by slide section 221 provided at four up-down left-right locations. Clamp portion 40 is formed to be assembled to upper beam 222 of lifting and lowering frame 41, so that the held tool T is housed in the frame.

Clamp portion 40 has clamp pin 43 projecting downward. Clamp pin 43 enters notch portion 215 of gripping block 212 relatively in a case where tool T is moved to up-down conversion position P2 by front-rear shifter 21. Clamp pin 43 penetrates downward guide 44 in a tubular shape fixed to upper beam 222, and is connected to air cylinder 45 fixed to an upper surface of upper beam 222. In air cylinder 45, bracket 46 is pinned to a piston rod projecting vertically upward, and further, clamp pin 43 is pinned to both ends of bracket 46. Clamp pin 43 has truncated flange portion 223 in a cone shape of which a lower end portion is widened like an umbrella, and a recessed portion matching a shape of flange portion 223 is formed on a lower surface side of gripping block 212.

Positioning frame 47 is fixed to a lower side of upper beam 222, and notch portion 225 into which gripping portion 202 of tool holder 15 is fitted is formed by the movement of tool T toward up-down conversion position P2. Accordingly, at up-down conversion position P2, tool holder 15 is fitted into positioning frame 47, and clamp pin 43 also enters into notch portion 215 of pot clamper 35. When air cylinder 45 pulls up clamp pin 43 in this state, gripping block 212 is sandwiched by flange portion 223 and cylindrical guide 44, so that pot clamper 35 is held by clamp portion 40.

Up-down shifter 22 is configured to raise and lower lifting and lowering frame 41 by a ball screw mechanism. Therefore, up-down servomotor 53 of which a rotation axis projects vertically upward is fixed to lower plate 52, and the rotation axis and screw shaft 54 are connected to each other. An upper end portion of screw shaft 54 is rotationally supported by bearing 56 of support block 55, and penetrates nut member 57 fixed to lifting and lowering frame 41. Support block 55 is also fixed to framework 85 side of automatic tool exchanger 8.

Since a lifted position of lifting and lowering frame 41 illustrated in FIG. 13 is a position at which front-rear shifter 21 and up-down shifter 22 are gripped, positioning for stopping lifting and lowering frame 41 at an accurate height is performed by rotational control of screw shaft 54 in up-down servomotor 53. Stopper 58 is provided on support block 55, so that lower beam 226 is applied to stop lifting and lowering frame 41 when a failure or the like occurs in the control. The configuration in the same manner by the stopper is applied to the lowered position illustrated in FIG. 14.

Figure 16:
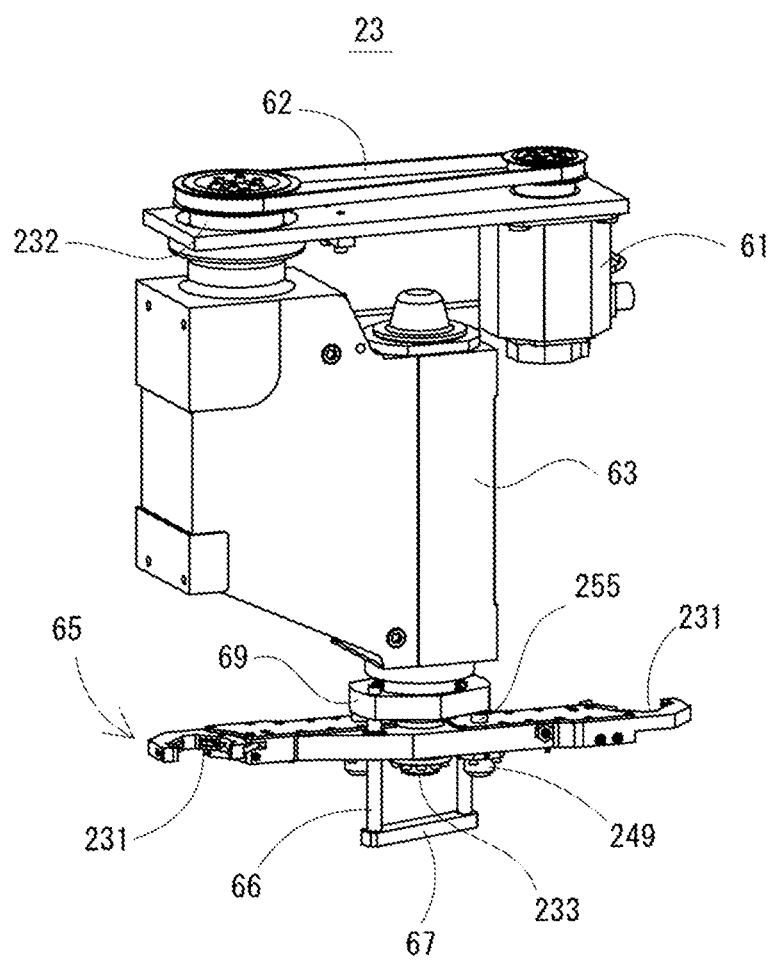
FIG. 16 is a perspective view illustrating a tool exchanging unit.

As illustrated in FIG. 14, in automatic tool exchanger 8, a position at which lifting and lowering frame 41 is lowered is a tool exchanging position, and tool changer 23 illustrated in FIGS. 7 and 9 is provided in accordance with the height at the position. FIG. 16 is a perspective view illustrating tool changer 23. Tool changer 23 is configured with tool exchange arm 65 having chucks 231 for gripping tool T at both end portions, cam device 63 for revolving tool exchange arm 65, revolving servomotor 61 for outputting rotation to cam device 63, and the like. In cam device 63, input shaft 232 projects upward, and timing belt 62 is bridged between output shafts of revolving servomotor 61 via a pulley of each shaft.

Figure 18:
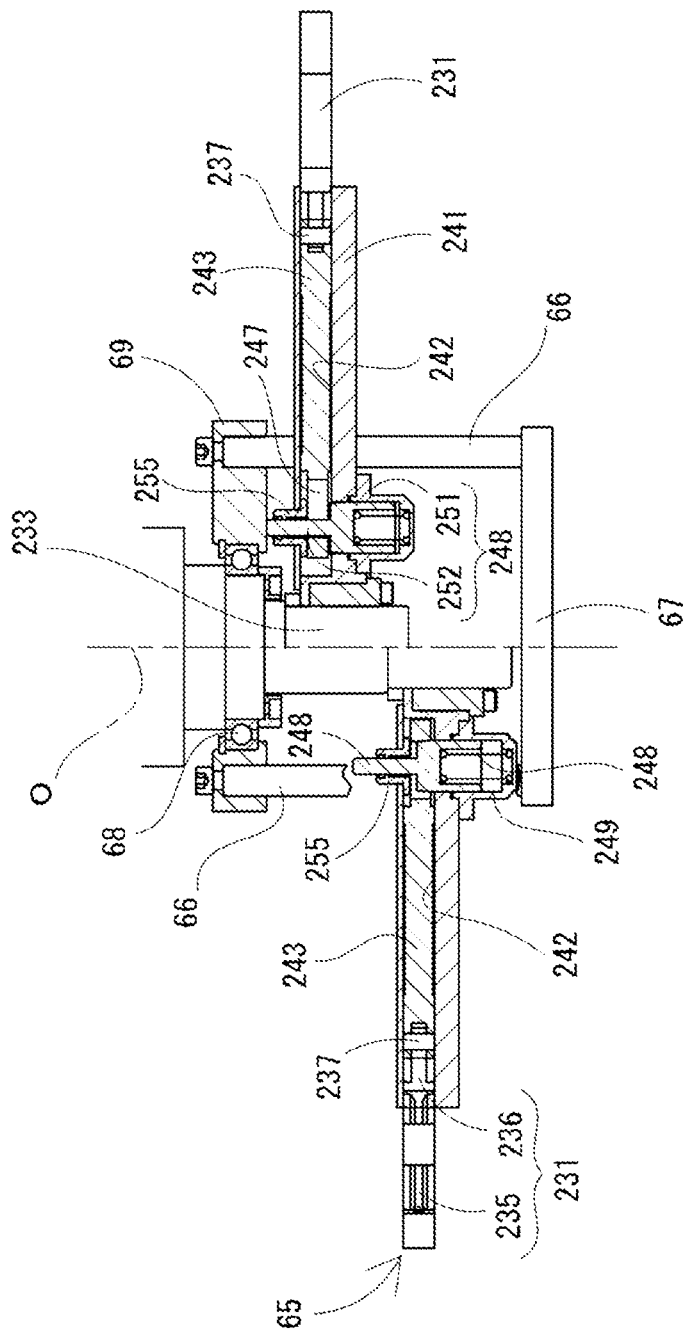
FIG. 18 is a cross-sectional view of the tool exchange arm taken in a longitudinal direction.

Cam device 63 is configured with a groove cam, a globoidal cam, or the like designed to output predetermined movement according to a rotation angle of the input side such that the rotational movement and the up-down movement can be output from output shaft 233 projecting downward by the rotation inputted from input shaft 232. The up-down movement of output shaft 233 is moved in a range of a height between the lowered left side and the lifted right side, as illustrated in FIG. 18. Accordingly, tool changer 23 can adjust the revolving angle and the displacement in the up-down direction with respect to tool exchange arm 65 by controlling the rotation of revolving servomotor 61.

Figure 17:
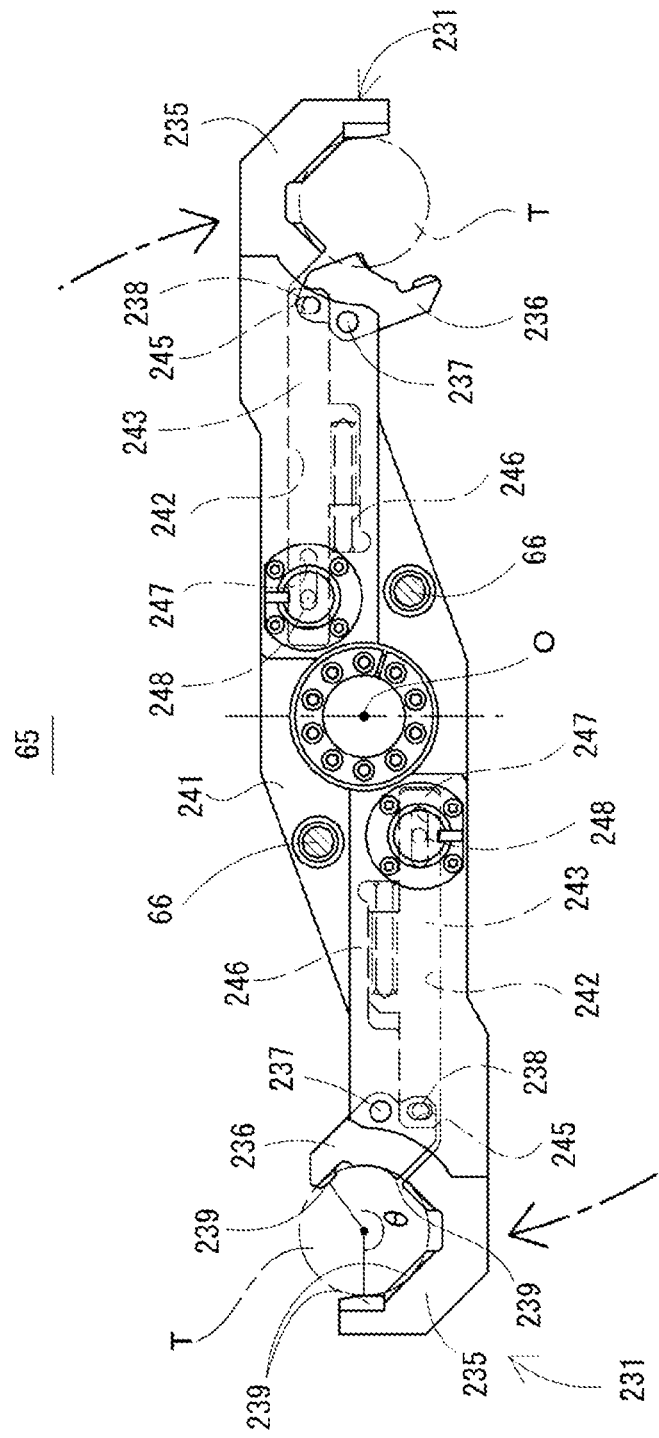
FIG. 17 illustrates a tool exchange arm as seen from a bottom side.

FIG. 17 is a view illustrating tool exchange arm 65 from a bottom side, and FIG. 18 is a cross-sectional view illustrating tool exchange arm 65 in the longitudinal direction. Tool exchange arm 65 has pair of chucks 231 configured to be symmetrical with respect to rotational center O. In FIGS. 17 and 18, a clamped state of tool T is illustrated on the left side, and an unclamped state is illustrated on the right side. Tool exchange arm 65 is a straight member, and chuck 231 for gripping tool T is configured with fixed claw 235 and movable claw 236 at both end portions of arm main body 241.

Movable claw 236 is smaller than fixed claw 235, is pivotably supported by fulcrum pin 237 at a position closer to rotational center O, and connecting pin 238 is fixed to an opposite side of a claw tip with fulcrum pin 237 therebetween. In addition, in chuck 231, two protruding portions 239 are formed on each of fixed claw 235 and movable claw 236 and recessed portion 228 (refer to FIG. 15) into which protruding portion 239 enters is formed in a neck portion of tool T, so that tool T can be surely gripped. In particular, chuck 231 is configured to be able to grip tool T at angle θ at which protruding portion 239 exceeds 180 degrees by the pivoting of movable claw 236.

In tool exchange arm 65, an internal cavity serving as guide 242 is formed in arm main body 241 thereof, and slide 243 linearly displaced in the longitudinal direction is incorporated in the internal space. Slide 243 is formed with connecting long-hole 245 at an end portion, and connecting pin 238 fixed to movable claw 236 is inserted into connecting long-hole 245, so that a link mechanism for converting the linear displacement of slide 243 and the pivoting displacement of movable claw 236 is configured. Connecting long-hole 245 is formed to be elongated in the lateral direction orthogonal to the displacement direction of slide 243. Chuck spring 246 is incorporated in guide 242, so that a biasing force toward movable claw 236 acts on slide 243 to maintain an open state of movable claw 236 at a normal time (right side in FIG. 17).

Tool exchange arm 65 is configured to reduce a striking sound generated when fixed claw 235 and movable claw 236 grip tool T. For example, since a conventional chuck has a configuration in which tool T is gripped by a biasing force of a spring, it is necessary to suppress tool T with a large force in order to prevent tool T from falling off, so that a repulsive force of the shortened spring when tool T is gripped generates a large striking sound. In this regard, tool exchange arm 65 is provided with a lock mechanism for preventing the gripped tool T from falling off without using a spring to grip tool T.

Slide 243 has locking long-hole 247 formed along the displacement direction at an end portion on rotational center O side opposite to connecting long-hole 245, into which lock pin 248 is inserted. Lock pin 248 is formed with lock portion 251 having a large diameter and guide section 252 having a small diameter, and is housed in bowl-shaped guide cap 249 fixed to a lower surface side of arm main body 241. Lock pin 248 has a diameter large enough for guide section 252 to penetrate locking long-hole 247 for locking, and projects upward through guide tube 255 fixed to an upper surface side of arm main body 241. Lock portion 251 having a large diameter is formed with a cylindrical portion that slides in cylindrical guide cap 249 and a lock portion having a narrower width so as to enter locking long-hole 247.

Locking spring is inserted into a hole opened in a lower surface of lock pin 248, and lock pin 248 is biased upward by being supported by guide cap 249. As illustrated in the right side of FIGS. 17 and 18, in lock pin 248 in a normal state in which movable claw 236 is opened, a position of locking long-hole 247 deviates, so that lock portion 251 is abutted on slide 243. On the other hand, in a case where tool exchange arm 65 grips tool T, movable claw 236 is pivoted by tool T, so that slide 243 is displaced toward rotational center O, as illustrated in the left side of FIGS. 17 and 18. Therefore, biased lock pin 248 is lifted such that a part of lock portion 251 enters locking long-hole 247 and the gripping state in which tool T is not fallen can be maintained.

In a case of releasing gripped tool T, it is necessary to push down lock pin 248. In this regard, in the present embodiment, as illustrated in the right side of FIG. 18, output shaft 233 contracts not only by rotating but also by moving upward, so that lock pin 248 is pushed down relatively by abutting on pushing ring 69, the pushing ring 69 being a pusher member. Pushing ring 69 is rotatably attached to a cylindrical portion of cam device 63 from which output shaft 233 projects by radial bearing 68. In tool exchange arm 65, two arm guides 66 penetrate through a position symmetrical with respect to rotational center O, an upper end portion is fixed to pushing ring 69, and a lower end portion is fixed to connecting bar 67.

As illustrated in FIG. 7 and the like, in automatic tool exchanger 8, tool changer 23 is disposed in the processing chamber in the vicinity of tool main spindle device 2. Therefore, it is necessary to prevent shavings, chips, or coolant generated during the processing on workpiece W from entering automatic tool exchanger 8 side. As illustrated in FIGS. 6 and 7, automatic tool exchanger 8 is provided with outer cover 70 and inner cover/partition plate 71, and up-down shifter 22 is provided such that lifting and lowering frame 41 moves therebetween in a movement cavity. Sight window 271 in which a glass is fitted is formed in outer cover 70. On the other hand, exchange window 272 is formed on inner cover 71 for preventing intrusion of the shavings or the like, and tool exchange shutter 72 for opening and closing exchange window 272 in accordance with the tool exchange is provided on the processing chamber side. In addition, tool changer 23 in the processing chamber also needs to protect tool exchange arm 65 from the chips and the like. Therefore, arm housing box 73 is formed in tool exchange shutter 72.

Figure 19:
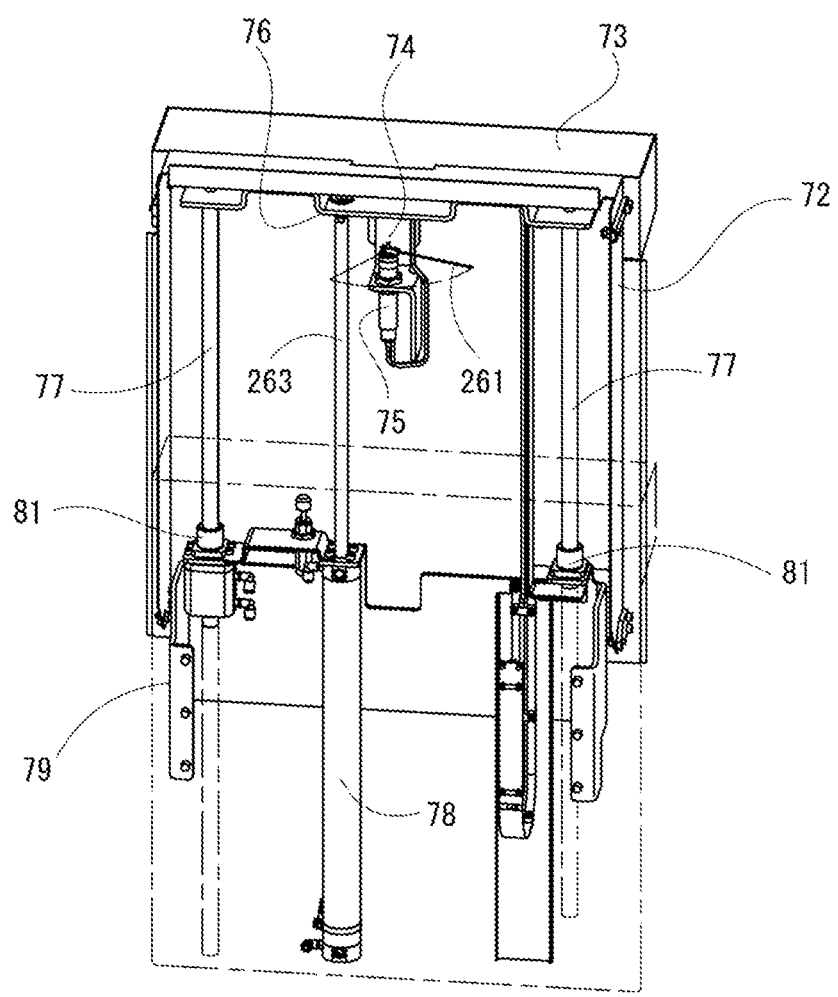
FIG. 19 is a perspective view illustrating a tool exchange shutter.

FIG. 19 is a perspective view illustrating tool exchange shutter 72, and is a view illustrating an outside of the processing chamber illustrated in FIG. 9 (on the left side in FIG. 7). Tool exchange shutter 72 is three-dimensionally formed, and fracture detecting sensor 75 is attached to bracket 74 fixed to an upper portion of tool exchange shutter 72. Fracture detecting sensor 75 contacts needle 261 swung on a tip portion of tool T having the matched height to check the presence or absence of a fracture.

Bracket 76 is fixed to a ceiling surface of an inner side of tool exchange shutter 72 (front side in FIG. 19), and an upper end portion of two guide rails 77 and a tip portion of piston rod 263 of lifting and lowering air cylinder 78 are fixed. Base bracket 79 is fixed to framework 85 side of automatic tool exchanger 8 so as to be located below lifted tool exchange shutter 72, and slide member 81 on which guide rail 77 slides and lifting and lowering air cylinder 78 are fixed thereto. Accordingly, tool exchange shutter 72 is configured to be lifted to a position indicated by solid lines in FIG. 9 by an extension operation of lifting and lowering air cylinder 78 and lowered to a position indicated by chain lines by a contraction operation to open exchange window 272.

Subsequently, with automatic tool exchanger 8 of the present embodiment, the tool exchange is performed on tool main spindle device 2 as follows. Even while the processing is performed in first workpiece main spindle device 3 and second workpiece main spindle device 4, multi-functional processing machine 1 causes two separation shutters 140 moving forward to sandwich tool main spindle device 2, so that the tool exchange can be performed without being affected by the processing. In tool main spindle device 2, main spindle head 131 stands by at the tool exchanging position by the movement in the Y-axis direction in base slide 134 and the movement in the X-axis direction in main spindle slide 135.

In tool magazine 11 of automatic tool exchanger 8, under the drive control of indexing servomotor 14, multiple tools T held by roller chain 13 being rotated are simultaneously moved in the circumferential direction, so that indexing in which corresponding tool T is moved to indexing position P11 illustrated in FIG. 9 is performed. Indexing position P11 is front-rear conversion position P1 illustrated in FIG. 11, and stands by in a state in which pot clamper 35 is opened. Therefore, tool holder 15 of indexed tool T enters pot clamper 35.

Tool T positioned at front-rear conversion position P1 is moved to up-down conversion position P2 by front-rear shifter 21. In front-rear shifter 21, by the extension operation of air cylinder 31, pot clamper head 32 on which pot clamper 35 is mounted is moved horizontally from front-rear conversion position P1 to up-down conversion position P2. At this time, since locking pin 211 is released from the constraint of stopping pin 213, movable block 206 sandwiches tool holder 15 with fixed block 205 by the biasing force of clamp spring 208. Each of movable block 206 and fixed block 205 holds tool holder 15 such that clamp projection 209 meshes with clamp groove 153.

When tool T is moved to up-down conversion position P2 by front-rear shifter 21, clamp pin 43 enters notch portion 215 of gripping block 212, and gripping portion 202 of tool holder 15 is fitted into notch portion 225 of positioning frame 47. Clamp pin 43 is pulled up by the extension operation of air cylinder 45, so that gripping block 212 is sandwiched between flange portion 223 and cylindrical guide 44. After tool T is gripped by clamp portion 40, lifting and lowering frame 41 is slightly lowered, so that pull bolt 203 of pot clamper 35 is detached from pot clamper head 32. Separated pot clamper head 32 is retracted toward front-rear conversion position P1 by the contraction operation of air cylinder 31. In this manner, the transfer of tool T from front-rear shifter 21 to up-down shifter 22 is completed.

In up-down shifter 22, the rotation of screw shaft 54 is converted into the up-down movement of lifting and lowering frame 41 by the drive of up-down servomotor 53, so that tool T held by clamp portion 40 is lowered from the height illustrated in FIG. 13 to the tool exchanging position illustrated in FIG. 14. The tool exchanging position has a height corresponding to tool changer 23 on the processing chamber side illustrated in FIG. 7. As illustrated in FIG. 9, exchange window 272 is provided below tool changer 23, and is closed by tool exchange shutter 72. Therefore, lifting and lowering air cylinder 78 performs a contraction operation at a timing when exchange tool T is lowered, and tool exchange shutter 72 is lowered to the position indicated by the dashed lines, so that exchange window 272 is opened.

When tool exchange shutter 72 is lowered, tool exchange arm 65 of tool changer 23 is moved out of arm housing box 73. At this time, tool exchange arm 65 is located between new tool T held by up-down shifter 22 and used tool T attached to tool main spindle device 2. Tool changer 23 revolves tool exchange arm 65 in the state illustrated in FIG. 16 by 90°, so that both tools T are gripped by pair of chucks 231. At this time, tool exchange arm 65 of tool changer 23 is revolved by the output of revolving servomotor 61, and output shaft 233 is maintained in the contracted state illustrated on the right side of FIG. 18. In other words, the height of tool exchange arm 65 is not changed, and lock pin 248 remains in contact with pushing ring 69.

In the position at which tool exchange arm 65 is revolved by 90°, chuck 231 in the open state abuts on the neck portion of tool T, so that movable claw 236 pivots about fulcrum pin 237. When movable claw 236 is closed, tool T is gripped by movable claw 236 and fixed claw 235, so that protruding portion 239 enters recessed portion 228. When movable claw 236 is pivoted by gripping tool T, slide 243 is pushed in via connecting pin 238 against the biasing force of chuck spring 246, so that a position of locking long-hole 247 is displaced. Even at this stage, lock pin 248 remains in contact with pushing ring 69.

Further, when the rotation with a fixed angle is outputted from revolving servomotor 61, output shaft 233 and tool exchange arm 65 are lowered to the height illustrated on the left in FIG. 18 by a cam mechanism in cam device 63. At this time, in tool exchange arm 65, lock pin 248 released from the pressing of pushing ring 69 is lifted in arm main body 241 by the biasing force of locking spring, so that lock portion 251 enters locking long-hole 247 and enters a lock state. In addition, by the lowering of tool exchange arm 65 gripping tool T, tool T is removed from tool holder 15 in up-down shifter 22, and tool T is also removed from the tool attachment portion of main spindle head 131.

Further, when rotation is output from revolving servomotor 61, the rotation is imparted to output shaft 233 via the cam mechanism in cam device 63, so that tool exchange arm 65 gripping tool T at both ends is revolved by 180 degrees without changing the height. Thus, the positions of new tool T and used tool T are exchanged. When rotation with a fixed angle is further output from revolving servomotor 61, output shaft 233 and tool exchange arm 65 are lifted to the height illustrated on the right in FIG. 18 by the cam mechanism in cam device 63. As a result, lock pin 248 abuts on pushing ring 69 to cancel the lock, and tool T gripped by tool exchange arm 65 is attached to each of tool holder 15 in up-down shifter 22 and the tool attachment portion in main spindle head 131. Thereafter, tool exchange arm 65 revolves in a reverse direction by 90 degrees to return to the standby state illustrated in FIG. 16.

When the tool exchange is performed, tool exchange shutter 72 is closed, and the height adjustment is performed such that a cutting edge of used tool T moved to the up-down shifter 22 matches fracture detecting sensor 75. The fracture checking by swinging needle 261 of fracture detecting sensor 75 is performed, and when needle 261 is abutted, it is determined that tool T is normal. Meanwhile, in a case where needle 261 is not abutted, it is determined that a fracture occurs, so that the subsequent process such as an alarm is performed. If no fracture occurs in tool T, lifting and lowering frame 41 of up-down shifter 22 is lifted, pot clamper 35 is transferred to pot clamper head 32 of front-rear shifter 21, and used tool T is returned to tool magazine 11.

As described above, with the present embodiment, although multi-functional processing machine 1 is configured such that tool main spindle device 2 is provided on the opposed biaxial lathe provided with first and second turret devices 5 and 6 with respect to first and second workpiece main spindle devices 3 and 4, each device is configured to be mounted on slant bed type base 7 and the moving range of each device is narrowed, so that the entire machine can be made compact and space-saving in the factory installation is enabled. In the present embodiment, since automatic tool exchanger 8 with respect to tool main spindle device 2 is provided in the machine body front portion, it is possible to install multi-functional processing machine 1 in a space-saving manner without increasing a size of multi-functional processing machine 1. In particular, automatic tool exchanger 8 is suitable for saving the space of entire multi-functional processing machine 1 by disposing tool magazine 11 in a center upper portion of a front surface of the machine body, and providing a shift device (front-rear shifter 21 and up-down shifter 22) for moving a tool between tool magazine 11 and tool changer 23.

Since automatic tool exchanger 8 is tool magazine 11 constituting a tool movement line in an oval shape extending in a machine body width direction by an endless roller chain, a large number of tools can be compactly housed in the machine body width direction. Automatic tool exchanger 8 can convey a tool of which a direction is changed by front-rear shifter 21 and up-down shifter 22, between tool magazine 11 that moves the tool in the circumferential direction and tool changer 23 located below. In automatic tool exchanger 8, since tool holder 15, pot clamper head 32, and pot clamper 35 are made of detachable members that can be directly or indirectly attached to and detached from tool T, tool T can be transferred between tool changer 23, front-rear shifter 21, and up-down shifter 22.

Since tool exchange arm 65 pivots movable claw 236 in a constant open state by the biasing force of chuck spring 246 so as to grip tool T with fixed claw 235, and then maintains the gripping state by the lock mechanism including lock pin 248, a large striking sound is not generated when tool T is gripped as with conventional art. In addition, since chuck 231 grips tool T with fixed claw 235 and movable claw 236 in a range of angle θ exceeding 180°, and protruding portion 239 enters recessed portion 228, the gripping state of tool T can be stabilized.

Automatic tool exchanger 8 can prevent the intrusion of shavings, coolant, or the like scattered in the processing chamber of multi-functional processing machine 1 by providing tool exchange shutter 72. In addition, since arm housing box 73 is provided in tool exchange shutter 72 although tool changer 23 is disposed in the processing chamber, tool exchange arm 65 can be protected from shavings or chips generated during the processing of the workpiece. In addition, by providing fracture detecting sensor 75 in tool exchange shutter 72, it is unnecessary to provide a special attachment portion.

Although one embodiment of the present disclosure has been described, the present disclosure is not limited to these, and various modifications can be made without departing from the gist thereof. For example, the multi-functional processing machine to which the automatic tool exchanger is attached is not limited to the structure of the present embodiment.

REFERENCE SIGNS LIST

1: multi-functional processing machine, 2: tool main spindle device, 3: first workpiece main spindle device, 4: second workpiece main spindle device, 5: first turret device, 6: second turret device, 7: base, 8: automatic tool exchanger, 9: workpiece conveyance device, 11: tool magazine, 13: roller chain, 14: indexing servomotor, 15: tool holder, 21: front-rear shifter, 22: up-down shifter, 23: tool changer, 32: pot clamper head, 35: pot clamper, 40: clamp portion, 41: lifting and lowering frame, 45: air cylinder, 53: up-down servomotor, 61: revolving servomotor, 65: tool exchange arm, 66: arm guide, 69: pushing ring, 72: tool exchange shutter, 73: arm housing box, 75: fracture detecting sensor, 78: lifting and lowering air cylinder, 131: main spindle head, 201: pot holder, 210: piston rod, 231: chuck, 235: fixed claw, 236: movable claw, 243: slide, 246: chuck spring, 248: lock pin

The invention claimed is:

1. An automatic tool exchanger provided in a multi-functional processing machine, the multi-functional processing machine includes a tool main spindle device disposed at a center between a first spindle device and a second spindle device, the automatic tool exchanger comprising:
   a tool magazine that is disposed positioned at a front surface upper portion of a machine body of the multi-functional processing machine and is configured to house at least one tool for exchange with the tool main spindle device;
   a shift device configured to move the at least one tool between the tool magazine and a tool exchanging position; and
   a tool changer configured to exchange the at least one tool between the shift device and the tool main spindle device,
   wherein the tool changer is provided with a tool exchange arm fixed to an output shaft, the output shaft rotates and moves up and down,
   wherein the tool exchange arm has a pair of chucks, each of the chucks includes a respective fixed claw and a respective movable claw, wherein the chucks are configured to be symmetrical about a rotation axis, and wherein each of the movable claws is maintained in a constant open state by biasing force of a respective chuck spring, and
   wherein a respective gripping state of each of the movable claws, generated by pivoting the movable claws against the at least one tool, is maintained by a respective lock mechanism.

2. The automatic tool exchanger according to claim 1, wherein the tool magazine is provided such that an endless roller chain in which the at least one tool is detachably held constitutes a tool movement line in an oval shape in a machine body width direction, and the tool magazine is disposed at the machine body front surface upper portion of the multi-functional processing machine.

3. The automatic tool exchanger according to claim 1, wherein the shift device includes a front-rear shifter that moves the at least one tool from the tool magazine in a machine body front-rear direction, and an up-down shifter that moves the at least one tool from the front-rear shifter in a machine body up-down direction.

4. The automatic tool exchanger according to claim 3, further comprising:
   a plurality of detachable members configured to be directly or indirectly attached and detached to and from, respectively, the at least one tool in a transfer step in which the at least one tool is transferred between the front-rear shifter and the up-down shifter, and between the up-down shifter and the tool changer.

5. The automatic tool exchanger according to claim 3, further comprising a partition plate for separating a movement cavity for the up-down shifter from a processing chamber in which the multi-functional processing machine performs workpiece processing,
   wherein the partition plate includes an exchange window for passing the at least one tool via the tool changer, which tool changer is provided in an inside of the processing chamber, and the partition plate is provided with a tool exchange shutter for opening and closing the exchange window.

6. The automatic tool exchanger according to claim 5, wherein the tool exchange shutter has an arm housing box for protecting the tool exchange arm.

7. The automatic tool exchanger according to claim 5, wherein a fracture detecting sensor for checking a fracture of the at least one tool is provided on the tool exchange shutter.

8. The automatic tool exchanger according to claim 1, wherein the tool exchange arm has a plurality of slides, each slide of the plurality of slides is connected to a respective one of the movable claws by a respective connecting hole and a respective connecting pin, each of the slides is displaced in a respective biasing direction in which the respective slide is biased by the corresponding chuck spring, and
   wherein each of the lock mechanisms is brought into a respective lock state in which a respective lock pin is biased through a respective locking hole formed to be elongated in a respective displacement direction of the corresponding lock pin in the corresponding slide, and wherein each of the locking mechanisms becomes in a respective unlock state by displacement of the corresponding lock pin which abuts on a pusher member by up-down movement of the output shaft.

9. The automatic tool exchanger according to claim 1, wherein in each the chucks of the tool exchange arm, multiple protruding portions to be fitted into a recessed portion formed in a neck portion of the at least one tool are formed, wherein the protruding portions include a protruding portion in each of the fixed claws and a protruding portion in each of the movable claws, and wherein for each of the chucks of the tool exchange arm, the corresponding fixed claw and the corresponding movable claw grip the at least one tool in a range exceeding an angle of 180°.

* * * * *